W. E. NICKERSON.
BLADE SHARPENING MACHINE.
APPLICATION FILED SEPT. 7, 1915.

1,235,590.

Patented Aug. 7, 1917.
14 SHEETS—SHEET 1.

W. E. NICKERSON.
BLADE SHARPENING MACHINE.
APPLICATION FILED SEPT. 7, 1915.

1,235,590.

Patented Aug. 7, 1917.
14 SHEETS—SHEET 3.

W. E. NICKERSON.
BLADE SHARPENING MACHINE.
APPLICATION FILED SEPT. 7, 1915.

1,235,590.

Patented Aug. 7, 1917.
14 SHEETS—SHEET 5.

W. E. NICKERSON.
BLADE SHARPENING MACHINE.
APPLICATION FILED SEPT. 7, 1915.

1,235,590.

Patented Aug. 7, 1917.
14 SHEETS—SHEET 8.

WITNESSES:
John Buckler
Mary A. Nyhan

INVENTOR:
Wm. E. Nickerson,
By E. D. Chadwick,
Attorney.

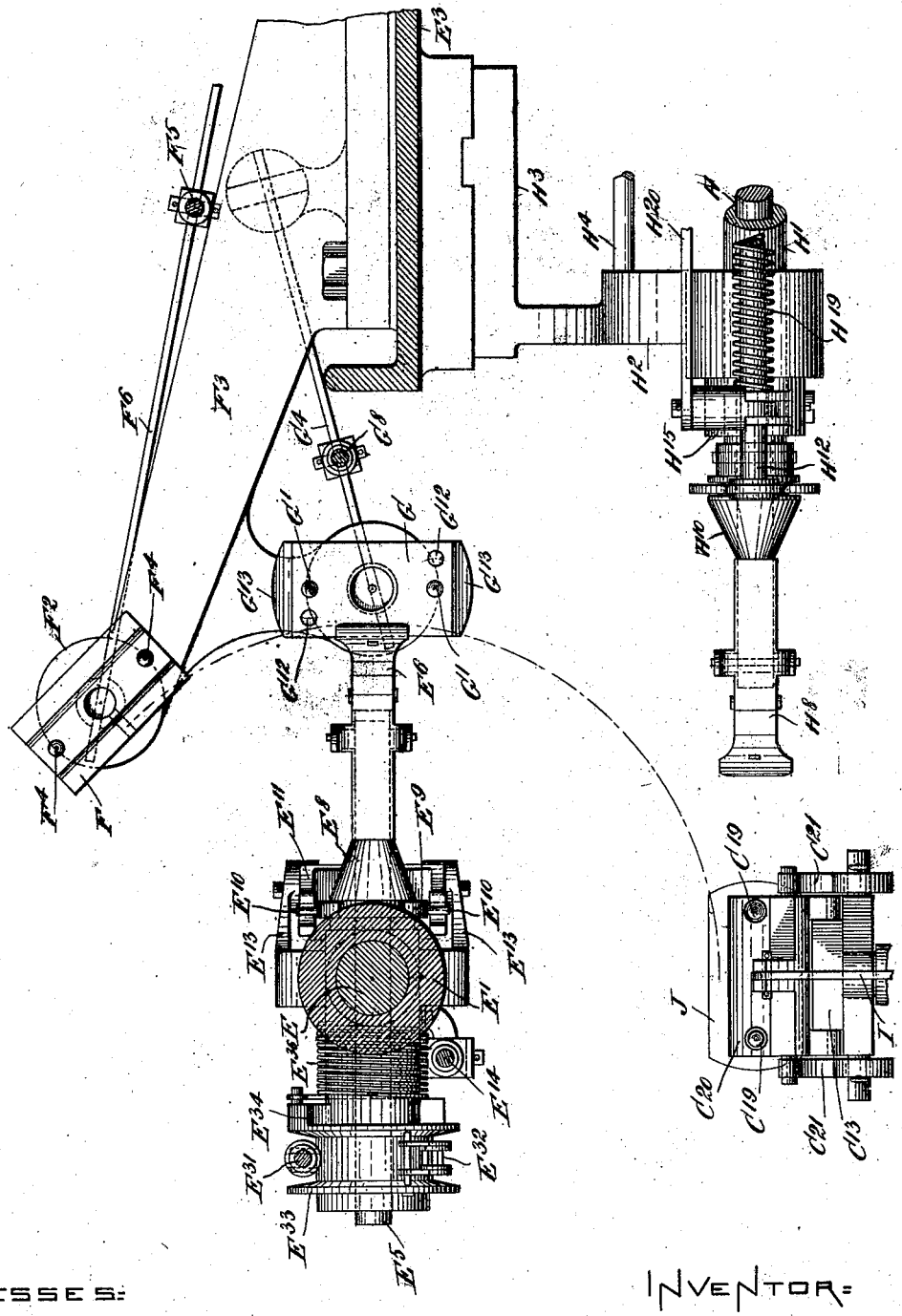

W. E. NICKERSON.
BLADE SHARPENING MACHINE.
APPLICATION FILED SEPT. 7, 1915.
1,235,590.
Patented Aug. 7, 1917.
14 SHEETS—SHEET 10.
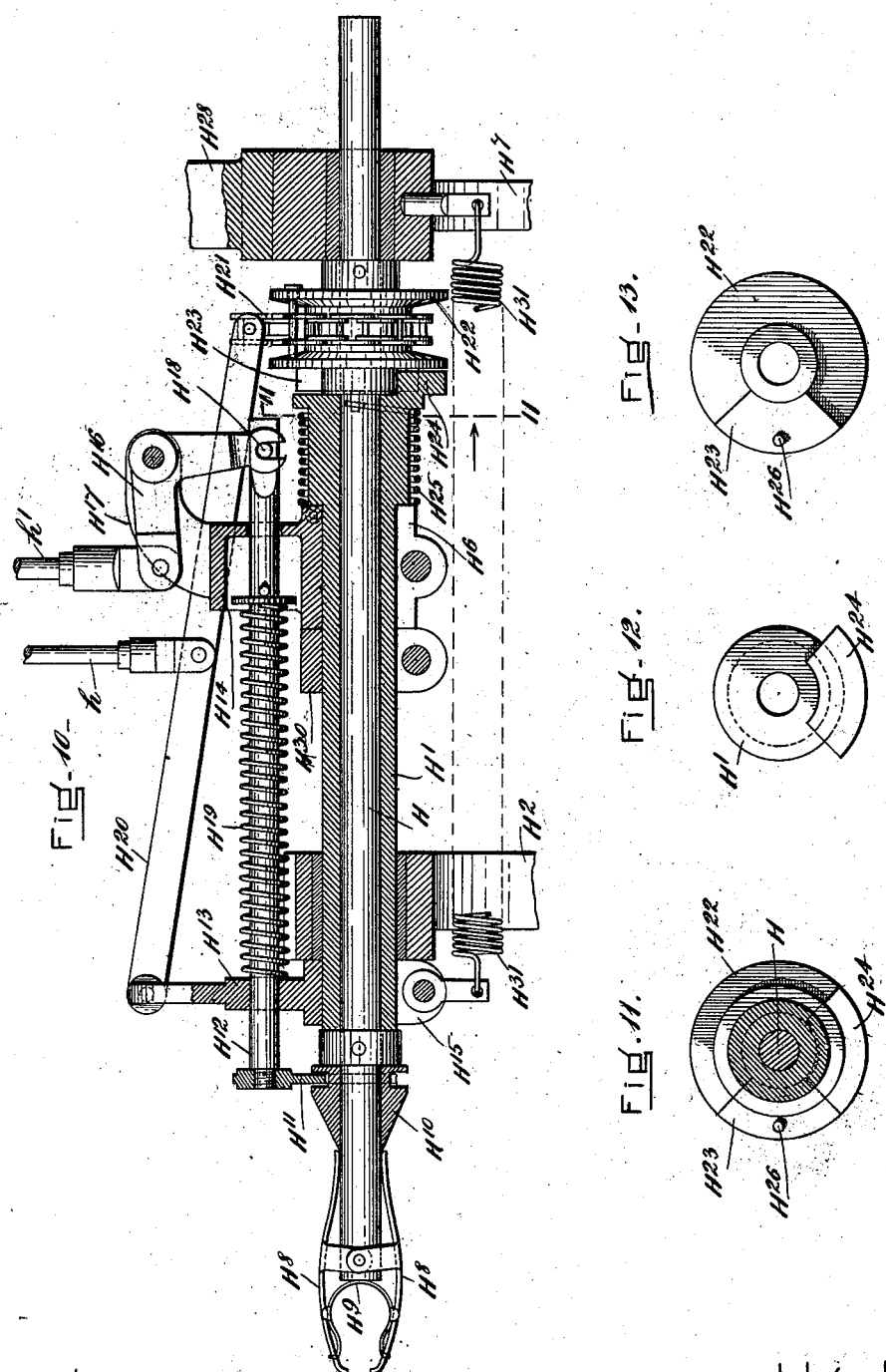

W. E. NICKERSON.
BLADE SHARPENING MACHINE.
APPLICATION FILED SEPT. 7, 1915.
1,235,590.
Patented Aug. 7, 1917.
14 SHEETS—SHEET 11.
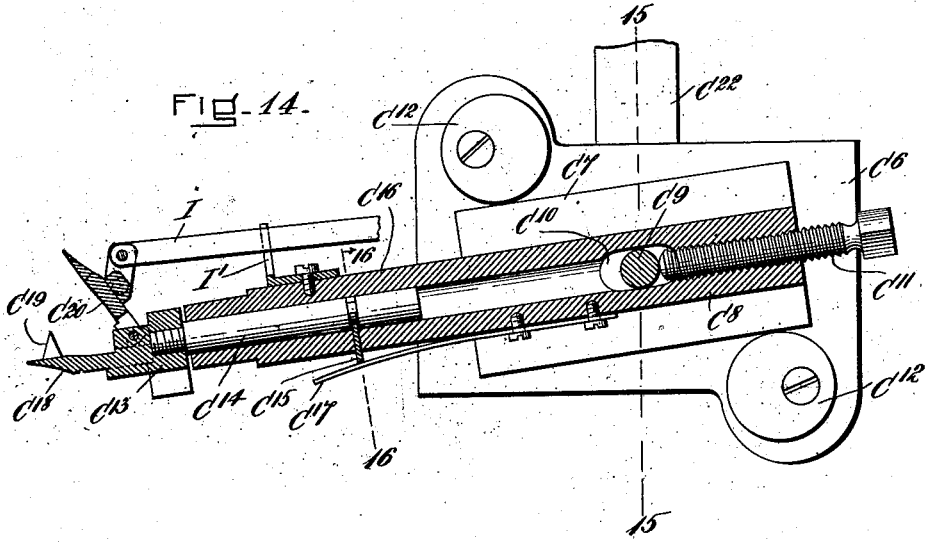
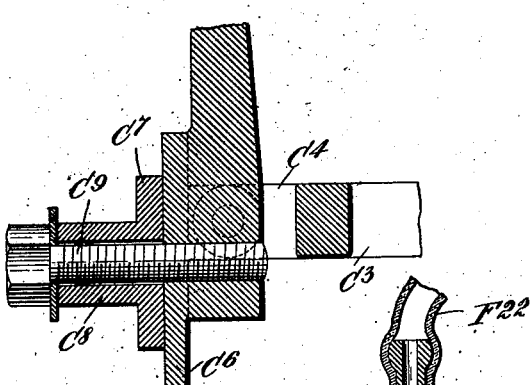
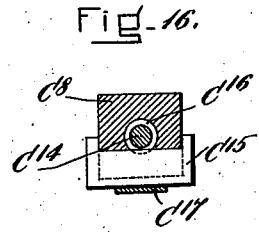
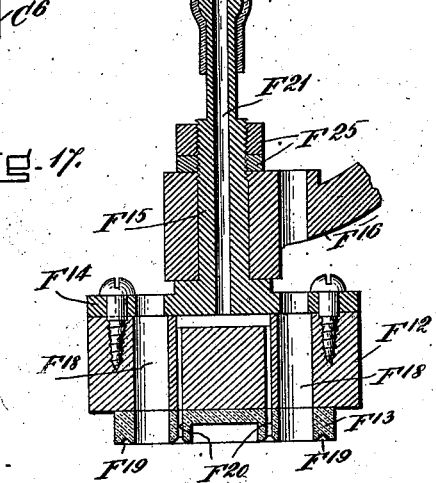
WITNESSES:
John Buckley
Mary A. Vyhan
INVENTOR:
Wm E. Nickerson,
By E. D. Chadwick
Attorney.

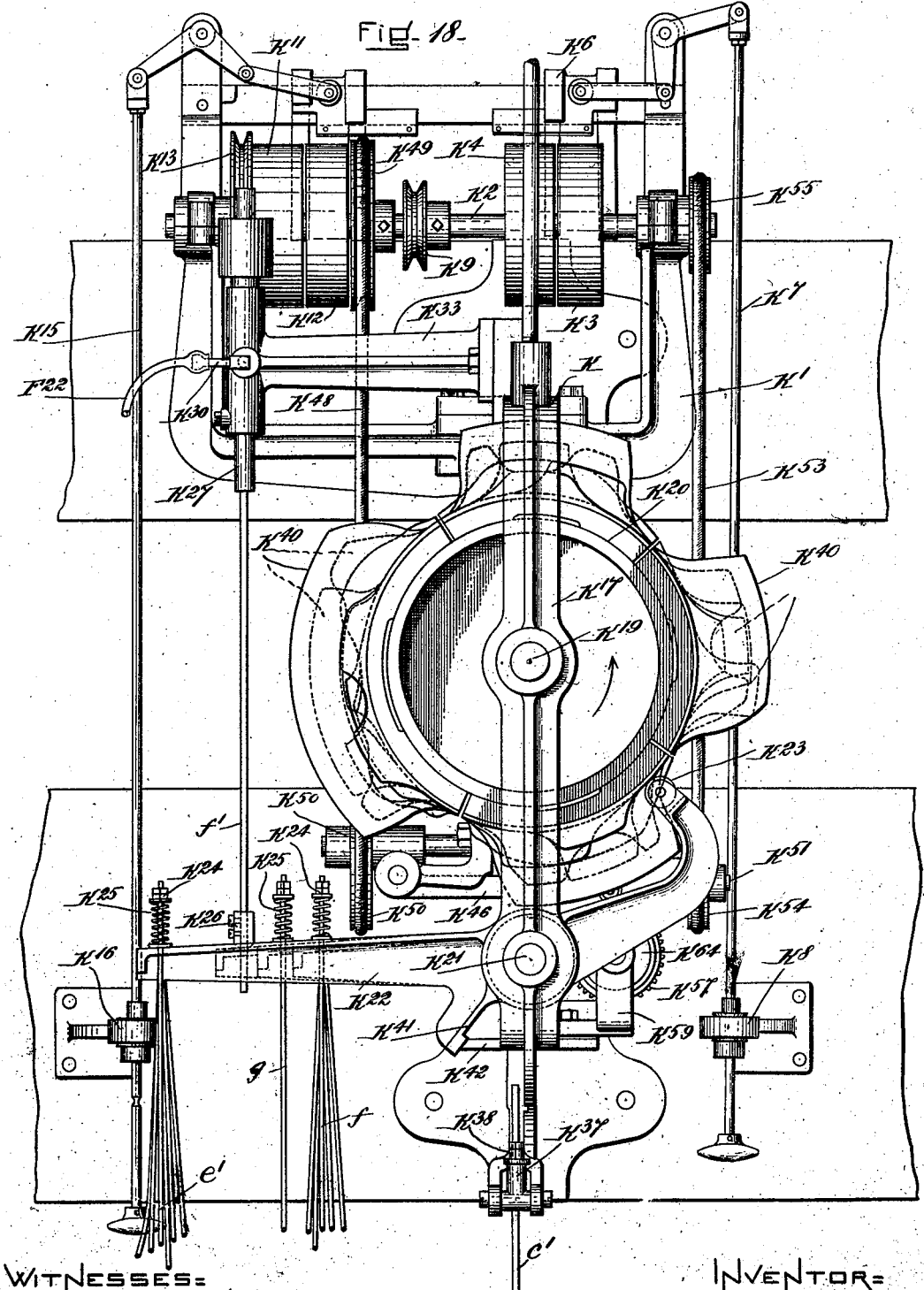

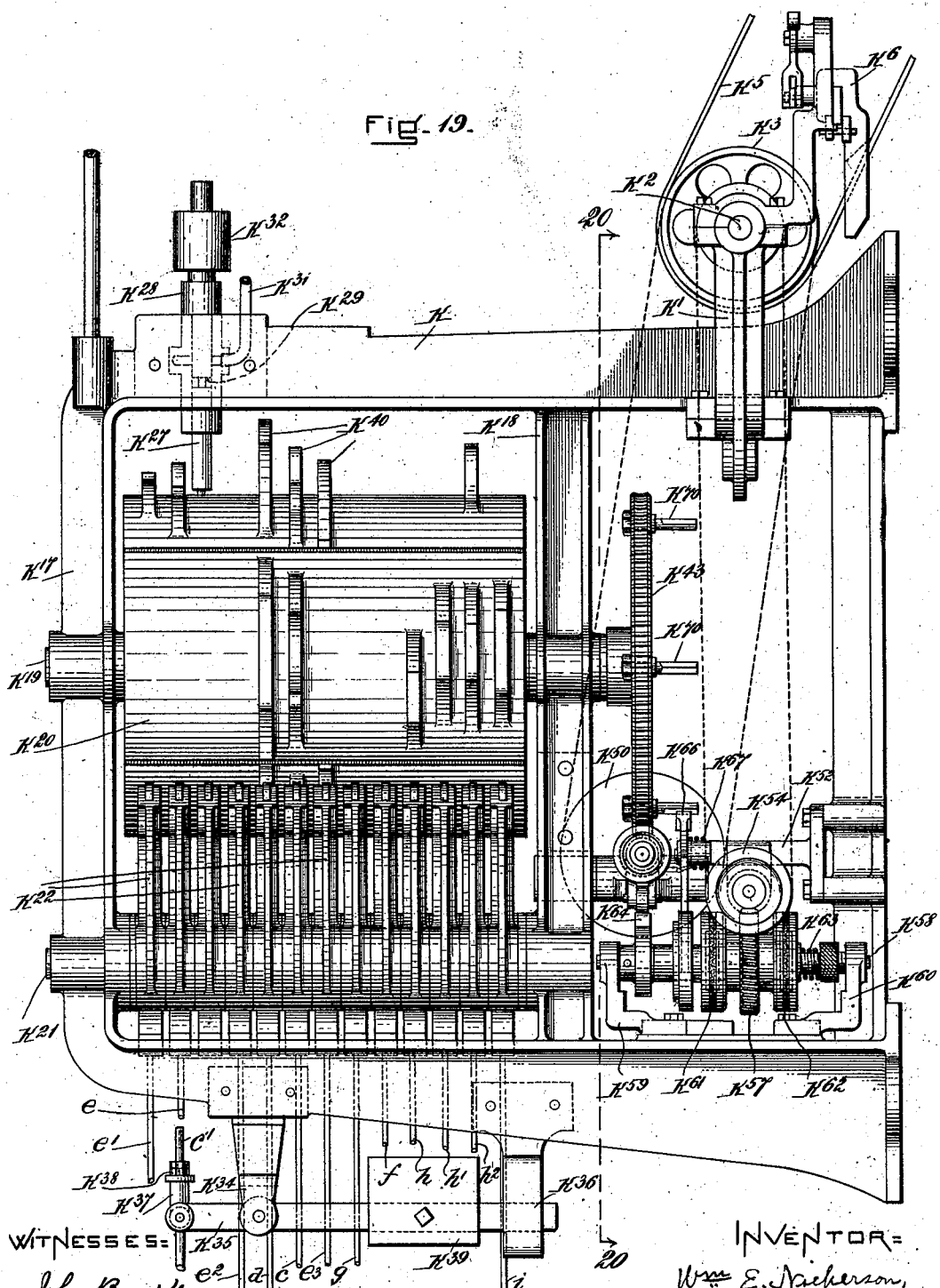

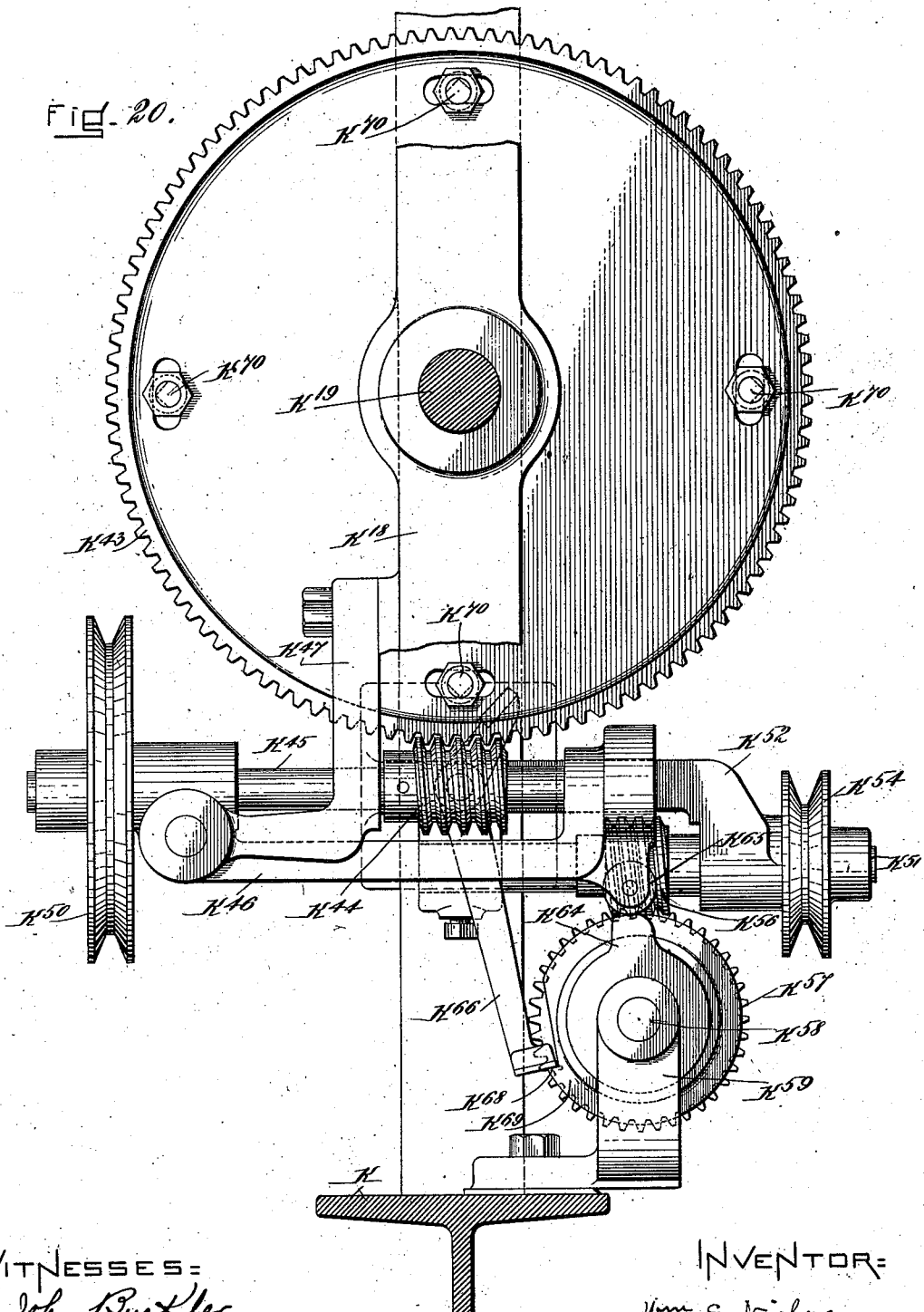

UNITED STATES PATENT OFFICE.

WILLIAM E. NICKERSON, OF CAMBRIDGE, MASSACHUSETTS, ASSIGNOR TO GILLETTE SAFETY RAZOR COMPANY, OF BOSTON, MASSACHUSETTS, A CORPORATION OF MASSACHUSETTS.

BLADE-SHARPENING MACHINE.

1,235,590.  Specification of Letters Patent.  Patented Aug. 7, 1917.

Application filed September 7, 1915. Serial No. 49,164.

*To all whom it may concern:*

Be it known that I, WILLIAM E. NICKERSON, a citizen of the United States, residing at Cambridge, in the county of Middlesex and State of Massachusetts, have invented new and useful Improvements in Blade-Sharpening Machines, of which the following is a specification.

This invention, which relates in general to blade-sharpening machines, is particularly intended to provide a machine for sharpening thin blades for safety razors which will be fully automatic in its action, so that in using the machine it will be necessary merely to place in it from time to time a supply of the blades to be sharpened and to remove from time to time a quantity of the blades sharpened thereby. The specific embodiment of my invention herein illustrated and described has been designed for the purpose of sharpening double-edged razor blades such as are used in the Gillette safety razor, but it can be utilized without substantial modification for sharpening otherwise similar blades which have a single cutting edge only, and it can be readily adapted for sharpening other blades and cutting implements.

In the accompanying drawings, which illustrate the machine as preferably constructed for the specific purpose above referred to,—

Fig. 9 is a sectional plan view showing the relative location of the blade holder which applies the blade to the grinding wheel, the blade-carrying mechanism shown in Figs. 6 and 7 and the blade-reversing mechanism shown in Fig. 8, the plane of section being indicated by the line 9—9 in Fig. 1;

Fig. 10 is in part a central longitudinal section and in part a side elevation of the blade-reversing mechanism shown in Fig. 8, as viewed from the opposite side, this figure being drawn to a larger scale than Fig. 8;

Figs. 11, 12 and 13 are detail views of the means employed for limiting the rotation of the spindle shown in Fig. 10, Fig. 11 being a section on the line 11—11 in Fig. 10;

Fig. 14 is in part a central longitudinal section and in part a front elevation of the blade holder and certain adjacent parts;

Fig. 15 is a section on the line 15—15 in Fig. 14;

Fig. 16 is a section on the line 16—16 in Fig. 14;

Fig. 17 is a vertical section illustrating a suction device hereinafter described;

Fig. 18 is a front elevation showing an overhead mechanism for applying the power to various parts of the machine illustrated in Fig. 1 and timing their operation;

Fig. 19 is a side elevation of the mechanism shown in Fig. 18, as viewed from the right; and Fig. 20 is a front elevation on a larger scale showing certain of the parts in the rear of the section line 20—20 in Fig. 19.

Figure 1:
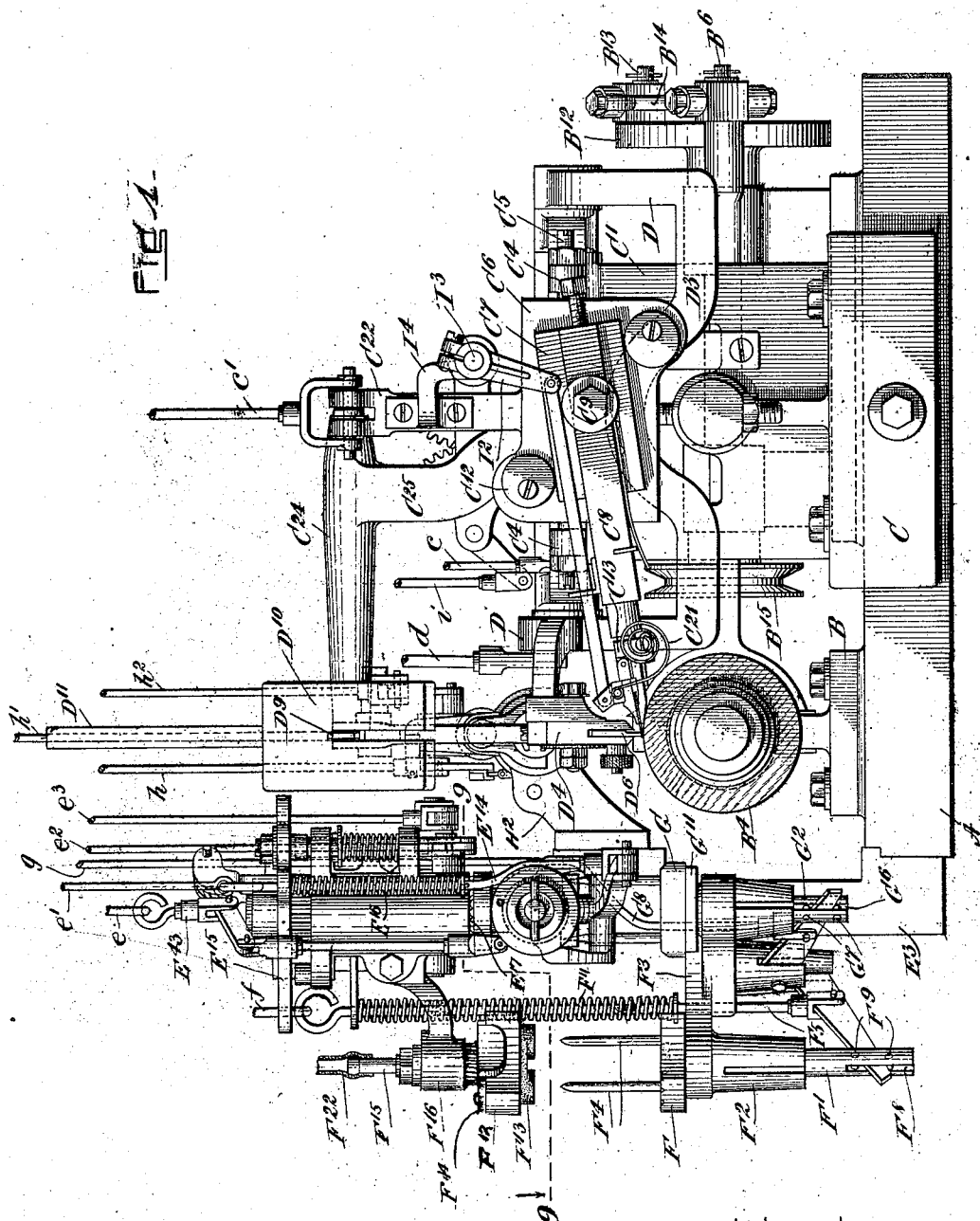
Figure 1 is a front elevation showing the complete machine with the exception of certain overhead mechanism hereinafter described.
Figure 2:
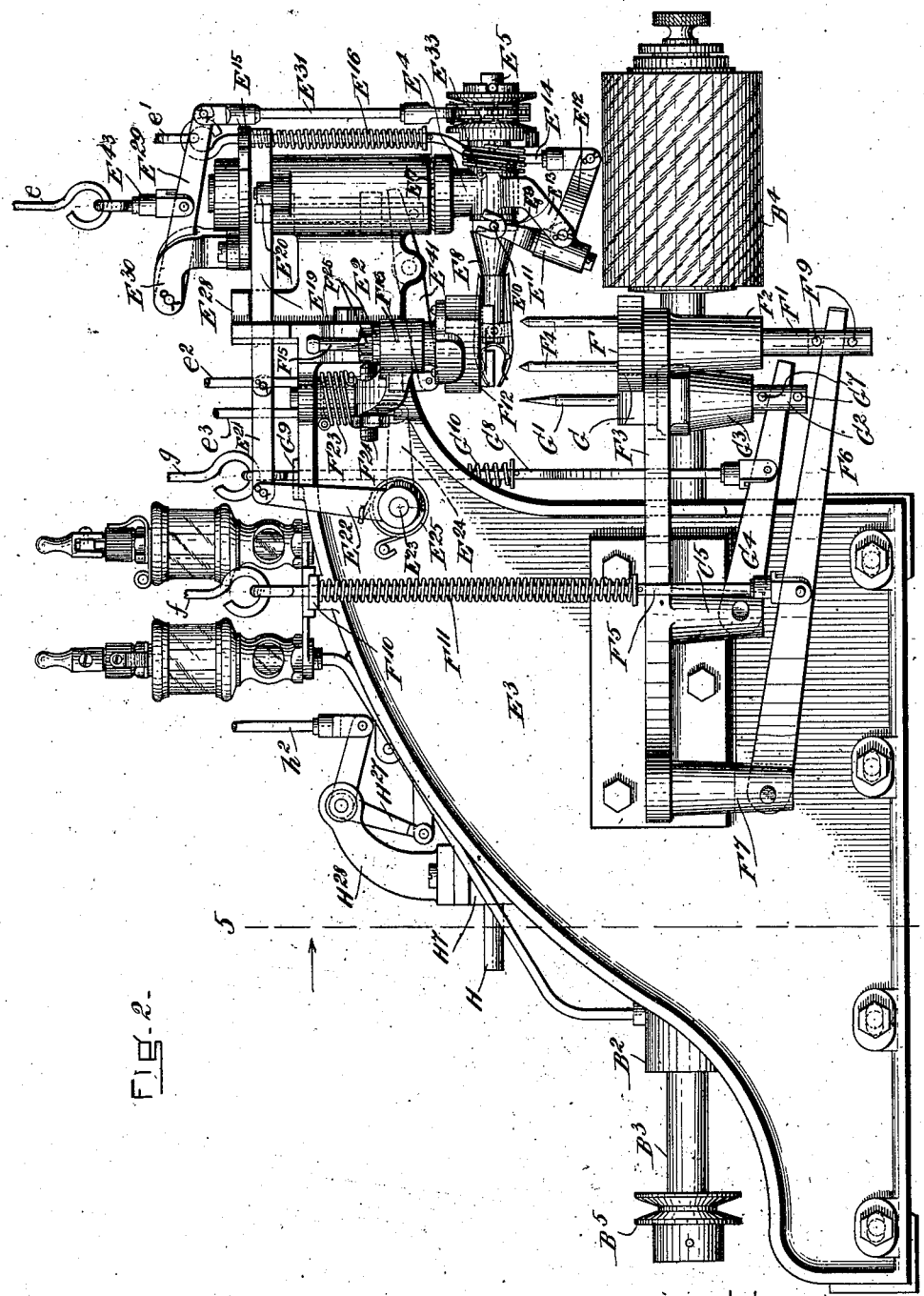
Fig. 2 is a side elevation of the left-hand end of the machine shown in Fig. 1.
Figure 5:
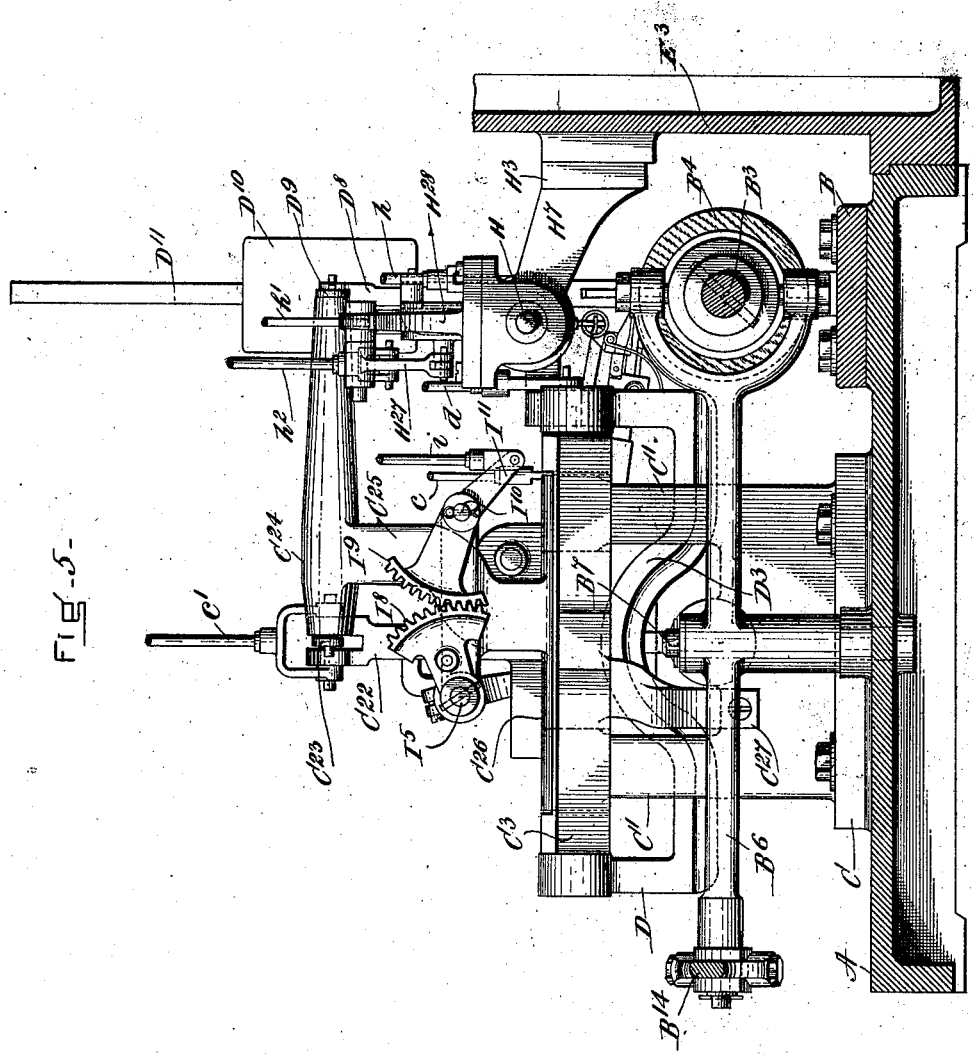
Fig. 5 is a partial rear elevation showing certain parts in section on the line 5—5 in Fig. 2.
Figure 6:
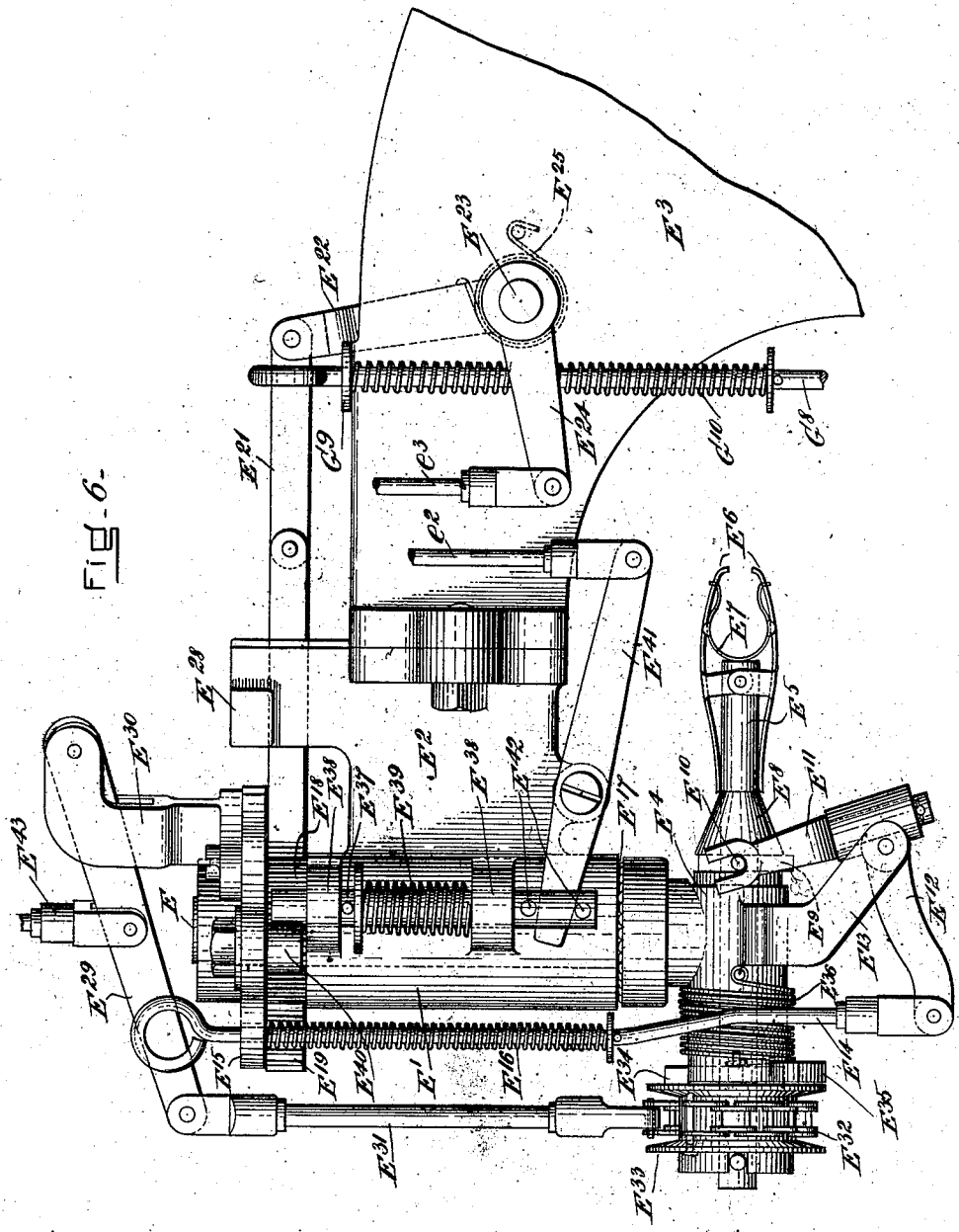
Fig. 6 is a side elevation, as viewed from the right, of a mechanism which carries the blade to and from the blade holder and also reverses it side for side.
Figure 7:
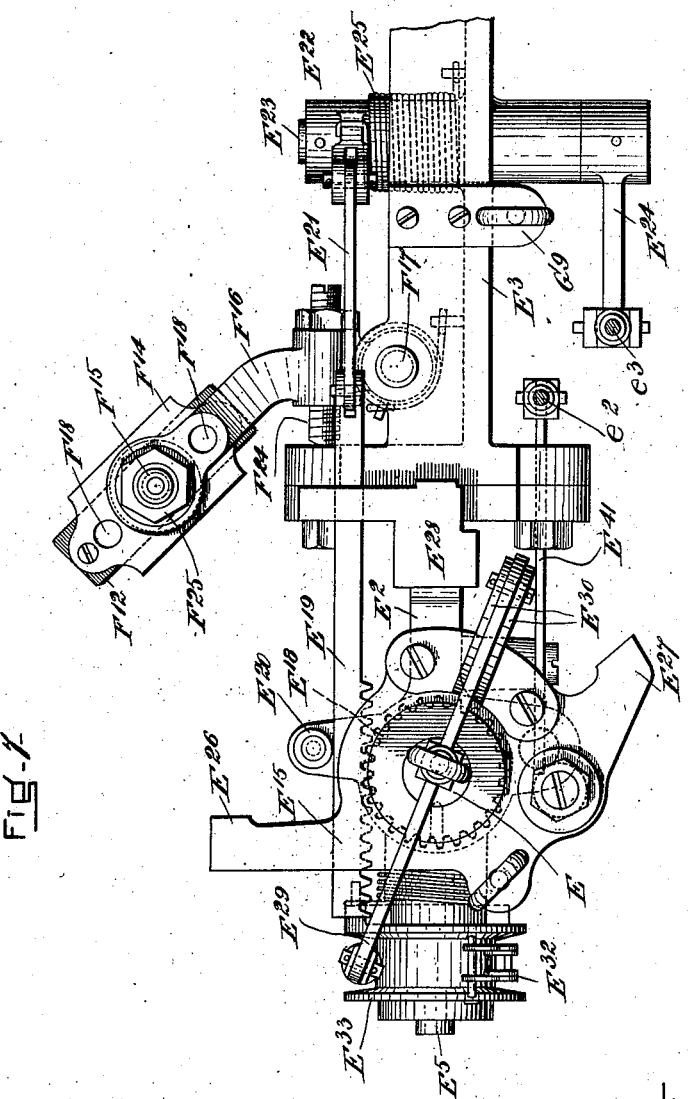
Fig. 7 is a plan view of the mechanism shown in Fig. 6.
Figure 8:
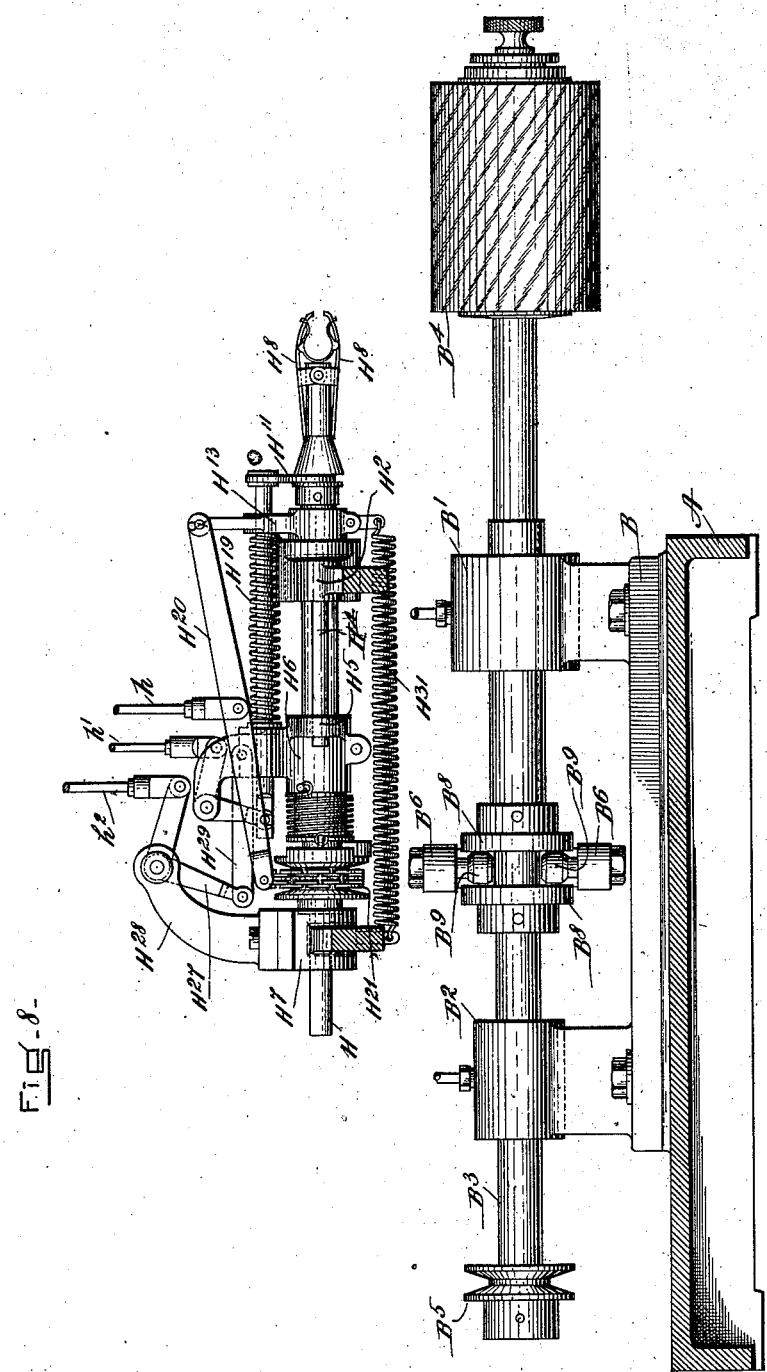
Fig. 8 is a side elevation showing the grinding wheel and a mechanism for reversing the blade edge for edge.

The working parts of the machine illustrated in Fig. 1 of the drawings are carried by a general base plate A which is adapted to rest on a bench and has bolted to it other base pieces which support certain groups of the parts employed. One of these base pieces, B, carries two standards B′, B², Fig. 8, in which is journaled a horizontal shaft B³ extending from front to back and provided at its front end with a grinding wheel, B⁴. This wheel is cylindrical in form and has an abrading surface suitable for the particular purpose for which the machine is to be used, the machine being equally adapted for rough-grinding blade edges and for honing the same. The shaft B³ is provided at its rear end with a belt pulley B⁵, whereby the shaft is continuously rotated by belt connections (not shown) to the overhead mechanism hereinafter described. Said shaft is also continuously reciprocated in an axial direction by means of an oscillating horizontal arm $B^6$ centrally mounted on a fixed stud $B^7$ and forked at one end to embrace the shaft $B^2$, which has fixed to it two spaced collars $B^8$ between which are located two diametrically-opposite rolls $B^9$ carried by the forked end of the arm $B^6$, as shown in Figs. 5 and 8. The arm $B^6$ is oscillated by means of a belt-driven countershaft $B^{10}$ journaled on a base piece $B^{11}$ bolted to the top of the plate A, said countershaft being provided with a disk $B^{12}$ carrying a crank pin $B^{13}$ from which a connecting rod $B^{14}$ extends to one end of the arm $B^6$. Universal joints are employed for connecting the ends of the rod $B^{14}$ to the arm $B^6$ and crank pin $B^{13}$ respectively, in order to provide for the necessary movements of these parts.

To the front portion of the base plate A is bolted another base piece C carrying a pair of uprights $C^1$, in the upper ends of which a transversely-extending horizontal rod $C^2$ is secured in fixed position. This rod supports and serves as a pivotal bearing for two frames, one of which, $C^3$, has its side arms mounted on said rod $C^2$ just outside of the uprights $C^1$, and extending forward therefrom, so that the front portion of the frame is capable of upward and downward movement. At its front end this frame $C^3$ is provided with lugs $C^4$ carrying a pair of horizontal pivot screws $C^5$ which point toward each other in the same axial line, and on the opposed inner ends of these screws is pivotally supported a vertical plate $C^6$ having a flat front face against which rests the flat rear face of another plate $C^7$ carrying a laterally-extending bar $C^8$, the plate $C^7$ and bar $C^8$ being pivotally mounted on a cap bolt $C^9$ passing through them and into the plate $C^6$. Said bar $C^8$ is provided with a longitudinal slot $C^{10}$ for the reception of the bolt $C^9$ and has a threaded bolt $C^{11}$ screwed into its rear end and bearing against said bolt $C^9$ so that the bar can be adjusted endwise. Its angular position on the front face of the plate $C^6$ is adjustably determined by two eccentrics $C^{12}$ pivotally mounted on said plate $C^6$ and arranged to bear against the opposite edges of the plate $C^7$ on opposite sides of the bolt $C^9$. When properly adjusted the plate $C^7$ is firmly clamped upon the plate $C^6$ by tightening said bolt.

The left hand end of the bar $C^8$ carries the blade holder $C^{13}$, which has a stem $C^{14}$ extending longitudinally into and rotatable in said bar $C^8$, where it is removably retained by a locking piece $C^{15}$ pressed into an annular groove $C^{16}$ in said stem by a spring $C^{17}$, as shown in Fig. 14. This blade holder comprises a blade-supporting plate $C^{18}$ provided with a pair of upwardly-extending tapering pins $C^{19}$ which are adapted to enter the end perforations in a Gillette blade and accurately position the same on said plate, with the edge of the blade projecting somewhat beyond the edge of the plate. A clamping plate $C^{20}$ hinged at one edge to the other parts of the blade holder is acted upon by springs $C^{21}$, Fig. 9, which tend to hold it down upon the blade when inserted in the holder. The holder is opened by lifting the plate $C^{20}$ whenever it is necessary to insert or remove a blade.

Figure 3:
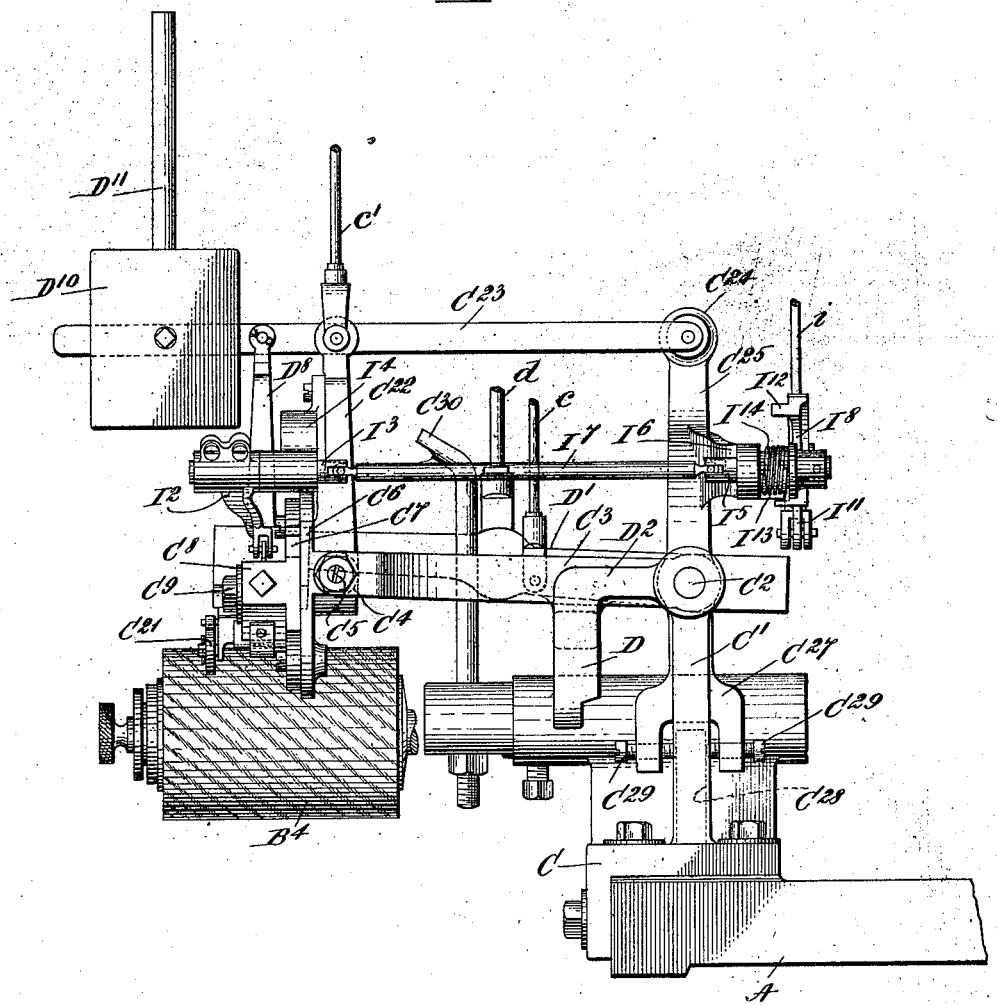
Fig. 3 is a side elevation showing certain parts at the front of the machine as viewed from the right.

The plate $C^6$ has its flat front face maintained in a vertical position as it moves upward and downward by means of a parallel-motion arrangement comprising an upwardly-extending arm $C^{22}$ pivotally connected at its upper end to the front end of a link $C^{23}$, the rear end of which is pivoted to the right-hand end of a transversely-extending bar $C^{24}$. This bar is carried by an arm $C^{25}$ extending upwardly from a hub $C^{26}$, Fig. 5, which is pivotally mounted on the rod $C^2$ between the uprights $C^1$, said hub being also provided with a downwardly-extending arm $C^{27}$ having a forked lower end which embraces a transversely-extending web $C^{28}$, as shown in Fig. 3. The forks at the lower end of said arm $C^{27}$ are provided with screws $C^{29}$ which bear against the opposite sides of the web $C^{28}$, so that by adjusting said screws the verticality of the plate $C^6$ can be accurately secured.

The other frame, D, which is carried by the rod $C^2$ comprises forwardly-extending arms $D^1$, $D^2$, pivotally mounted on the ends of the rod and connected below the frame $C^3$ by a cross bar $D^3$. The left hand arm $D^1$ extends forward to a position over the grinding wheel $B^4$, where it carries a plate $D^4$ pivotally mounted on a horizontal bolt $D^5$ extending at right angles to the axis of the wheel $B^4$. In the lower edge of the plate $D^4$ is formed a vertical recess extending from front to back and containing a pressure bar $D^6$ which is held in the recess by a pin $D^7$ passing through the same, the bar being adapted to rock slightly on this pin. By reason of the pivoting of the frame D on the rod $C^2$ the plate $D^4$ is capable of movement upward and downward, and during such movement it is maintained with its lower edge in a substantially horizontal position by means of a parallel-motion arrangement similar to that employed for keeping the plate $C^6$ vertical in all positions, and comprising an upwardly-extending arm $D^8$ carried by said plate $D^4$ and pivoted at its upper end to a link $D^9$, the rear end of which is pivoted to the left-hand end of the bar $C^{24}$.

The parts above described are so arranged that when a blade is inserted in the blade holder $C^{13}$ and applied to the grinding wheel $B^4$ by lowering the plate $C^6$ the edge to be ground rests on the top of the grinding wheel directly over its axis and in exact parallelism therewith, and is presented to the grinding surface at an angle corresponding to the bevel of said edge. Since the stem $C^{14}$ is rotatable in the bar $C^8$ the blade holder is self-adjusting to the top surface of the wheel. After a blade has thus been applied to the grinding wheel the plate $D^4$ is lowered until the pressure bar $D^6$ bears upon the top of the blade just back of its extreme edge, on which it is caused to exert a pressure by means of a weight $D^{10}$ supported on the forwardly-projecting front end of the link $D^9$ and provided with an upwardly-extending pin $D^{11}$ on which additional weights may be placed, according to the amount of pressure desired. The capacity of the pressure bar $D^6$ to turn on its supporting pin $D^7$ renders said bar self-adjusting to the top surface of the blade, so that the applied pressure is distributed uniformly along its edge. The grinding operation takes place with the parts in the position just described, which is the position shown in Fig. 1, and after this operation has been completed the plate $D^4$ is lifted, leaving the blade holder free to be lifted and opened for the removal of the blade.

As described thus far the machine has substantially the same construction and mode of operation as the grinding machine forming the subject matter of U. S. Letters Patent No. 1,126,839, dated February 2, 1915, to which reference may be made for a more complete description of the details of construction and the mode of operation of the various parts. For present purposes it will suffice to point out that after a blade has been placed in the holder its projecting edge is ground first on one side and then on the other, the blade being reversed side for side between these two grinding operations, and then the blade is reversed edge for edge in the holder and its other edge is ground first on one side and then on the other in the same manner, whereupon the blade is removed from the holder. In the use of the patented machine, however, although each grinding operation is stopped automatically, the insertion, reversal and removal of the blade and its application to the grinding wheel are all manual operations performed by an attendant, whereas in the present machine the parts already described are associated with and supplemented by automatic mechanisms which not only stop the grinding operations but also insert the blades one by one in the blade holder, lower the frames which carry the blade holder and pressure bar, effect the necessary changes in the position of the blades with relation to the holder, and remove the blades therefrom when sharpened, the grinding of each blade edge being followed by the operation in proper sequence of the various parts which effect the next succeeding change in the position of the blade until finally the sharpened blade is deposited in a predetermined location.

The automatic mechanisms above referred to may be constructed and arranged for operation in various ways, but as preferably constructed and arranged there are three main groups of parts, one of which groups takes the blades one by one from a supply stack, carries each blade to the blade holder and places it therein, takes the blade from the blade holder when sharpened, carries it to the point of delivery and there deposits it. This group of parts is also utilized for reversing the blade side for side after one side of the blade edge has been ground. Another group of parts takes the blade from the blade holder after one edge has been ground on both sides, reverses it edge for edge and replaces it in the blade holder in position to have its other edge ground, but this group is not required in case single-edged blades are to be ground. The third group of parts is utilized for applying power to the blade manipulating and grinding mechanisms and timing their operation, and constitutes what has been referred to as the overhead mechanism, being located above said blade manipulating and grinding mechanisms and connected thereto by pull rods, belts and the like as hereinafter explained. These various mechanisms and associated parts, as constructed and arranged in the specific machine illustrated in the drawings, will now be described.

The blade-carrying mechanism, the details of which are illustrated in Figs. 1, 2, 6, 7 and 9, comprises a vertical spindle $E$ rotatably mounted in the front end $E^1$ of a bracket $E^2$ which is secured to the forwardly-projecting upper end of a supporting plate $E^3$ bolted to the left-hand edge of the base plate $A$. At its lower end the spindle $E$ carries a transversely-extending hub $E^4$ in which is rotatably mounted a horizontal blade-carrying spindle $E^5$, to one end of which are pivoted two blade-gripping jaws $E^6$ located one above the other and having a spring $E^7$ interposed between their outer ends for separating them. The jaws $E^6$ are operated to grip a blade by means of a conical sleeve $E^8$ loosely mounted on the spindle $E^5$ and provided at its base with an annular groove in which is located a yoke $E^9$ having diametrically-opposite pins $E^{10}$ projecting outward therefrom. These pins enter the notched upper ends of the arms of another yoke $E^{11}$ carried by a lever $E^{12}$, which is pivotally supported between a pair of arms $E^{13}$ carried by and extending downward from the hub $E^4$ and is connected at its opposite end to an upwardly-extending rod $E^{14}$. At its upper end this rod passes through and is guided by a plate $E^{15}$ fixed to the upper end of the spindle E, and is surrounded by a spring $E^{16}$ which tends to force said rod downward and thereby draw the sleeve $E^8$ backward with respect to the blade-gripping jaws $E^6$. By pulling the rod $E^{14}$ upward the sleeve $E^8$ is forced forward and wedged between the rear ends of the jaws $E^6$, thereby causing their front ends to close, and inasmuch as these jaws and the parts which operate them are all carried by and rotate with the spindle E the jaws can be opened or closed in any position into which they may be moved by the rotation of said spindle. A ball bearing $E^{17}$ is interposed between the lower end of the bracket $E^2$ and the opposed upper portion of the hub $E^4$ in order to prevent undue frictional resistance to the rotation of the spindle E when the parts carried thereby are subjected to lifting strains.

The spindle E and the parts which it carries are rotated in one direction by means of a pinion $E^{18}$ secured to the spindle just below the plate $E^{15}$ and meshing with a rack $E^{19}$ arranged to slide horizontally in a forward and backward direction, the rack being guided during such movements by a roller $E^{20}$ mounted on the bracket $E^2$ and by a perforation in said bracket through which a rearward extension of the rack passes. Said rack $E^{19}$ is operated by a link $E^{21}$ connecting its rear end to an upwardly-extending arm $E^{22}$ secured at its lower end to a rock shaft $E^{23}$ journaled in the plate $E^3$. The rock shaft $E^{23}$ carries another arm $E^{24}$ which extends forwardly, so that when it is moved upward the rack $E^{19}$ is drawn backward, and this movement results in rotating the spindle E in such direction as to swing the blade-gripping jaws $E^6$ toward the blade holder $C^{13}$. The return movement of said jaws is effected by a spring $E^{25}$ surrounding the rock shaft $E^{23}$ and operating on the arm $E^{22}$.

The plate $E^{15}$ has two outwardly-extending stop arms $E^{26}$ and $E^{27}$ adapted to strike, respectively, against the opposite sides of an upwardly-projecting lug $E^{28}$ on the bracket $E^2$ and thereby limit the rotational movements of the spindle E in both directions. By means of these stop arms and a movable stop hereinafter described the jaws $E^6$ are caused to come to rest at three different points. At one of these points they are in position to take a blade from the source of supply, at another point they are in position to deposit a sharpened blade, and at the other point they are in position to place a blade in the blade holder $C^{13}$ or to take a blade therefrom. These three positions are illustrated in Fig. 9, in which the curved broken line indicates the horizontal path of movement of the outer extremities of the jaws. The blade holder $C^{13}$ is located at one end of this path, and at its other end is located a blade stack supporter consisting of a horizontal block F secured to the upper end of a rod $F^1$ which is adapted to slide vertically in a fixed guide $F^2$ carried by a bracket $F^3$ bolted to the plate $E^3$. The block F is provided with two vertical pins $F^4$ having tapered upper ends and spaced in correspondence with the end perforations in a Gillette blade, so that a stack of such blades can be placed upon the block with the pins $F^4$ passing through the perforations in all the blades and accurately positioning them one above another. The block F and the blade stack which it carries can be raised until the topmost blade in the stack, whatever the height of the stack may be, is brought into contact with a stationary suction device which retains this blade when the block is lowered, thereby separating it from the other blades in the stack and freeing it from the pins $F^4$. The block F is raised and lowered by means of an upwardly-extending rod $F^5$ connected at its lower end to a lever $F^6$ which is pivoted at its rear end to a fixed support $F^7$ and has its front end located in a vertical slot $F^8$ in the lower end of the rod $F^1$, where it passes between two cross pins $F^9$. The rod $F^5$ is guided at its upper end by passing through a perforation in a plate $F^{10}$ secured to the top of the plate $E^3$ and is surrounded by a spring $F^{11}$ which supplements the action of gravity when the block F is lowered by lowering said rod $F^5$.

The suction device above referred to is located directly above the block F and comprises, as shown in Fig. 17, a body portion $F^{12}$ having a soft rubber pad $F^{13}$ secured to its under side. The body portion $F^{12}$ is carried by a holder $F^{14}$ having a vertical stem $F^{15}$ which passes upward through the outer end of an arm $F^{16}$ rotatably mounted at its other end on a vertical pin $F^{17}$ carried by the plate $E^3$. The body portion $F^{12}$, pad $F^{13}$, holder $F^{14}$ and arm $F^{16}$ are collectively provided with two vertical perforations $F^{18}$ adapted to receive the pins $F^4$ respectively, and on its flat bottom face said pad is provided with two annular grooves $F^{19}$ each surrounding one of the perforations $F^{18}$. From each of these grooves an open passage $F^{20}$ leads to another passage $F^{21}$ extending upward through the holder $F^{14}$ and its stem $F^{15}$, the upper end of which forms a nipple for the reception of a flexible tube $F^{22}$ through which air is withdrawn for the purpose of exerting suction on the successive blades when in contact with the bottom face of the pad $F^{13}$. The suction device is held in its normal position over the blade stack and above the upper ends of the pins $F^4$ by means of a spring $F^{23}$ (Fig. 2) acting on the arm $F^{16}$, from which position said suction device can be swung backward by hand and thus removed from above the upper ends of the pins $F^4$ so as to permit a stack of unground blades to be placed on the block F. An adjustable stop screw $F^{24}$ carried by the arm $F^{16}$ accurately locates the normal position of said arm, the suction device being capable of adjustment within the outer end of the arm by rotating the stem $F^{15}$ therein until the perforations $F^{18}$ are brought exactly in line with the pins $F^4$, which enter the perforations when the block F moves upward. After adjustment the suction device is clamped in fixed relation to the arm $F^{16}$ by lock nuts $F^{25}$ on the stem $F^{15}$.

When a blade is held by suction against the bottom face of the pad $F^{13}$ it lies in the horizontal plane in which the jaws $E^6$ meet when closed and projects at its front edge somewhat beyond said pad, which is so adjusted that when the open jaws stop in their blade-receiving position they embrace the projecting edge of the blade and are located midway between its ends, with the length of the blade extending at right angles to the length of the jaw-carrying spindle $E^5$. The blade is gripped by the jaws and held in this relation thereto while they carry it to the blade holder $C^{13}$ at the opposite extremity of their path of movement, and when the jaws stop at the end of such movement the blade is held thereby in the position in which it is received by the blade holder and subsequently taken therefrom. Consequently the reversal of the blade side for side with respect to the blade holder can be accomplished by imparting a half rotation to the spindle $E^5$ while the blade is held by the jaws $E^6$, since the resulting movement of the blade will not otherwise affect its position in any way, and this method of reversing the blade side for side is employed in the present machine for the reason that it avoids the necessity of rotating the blade holder in the bar $C^8$ for the same purpose, as is done in the use of the patented machine above referred to, and thus makes it possible to effect the automatic opening and closing of said holder by the simple mechanism hereinafter described.

The spindle $E^5$ is rotated in one direction by lifting a lever $E^{29}$ pivoted at one end to a fixed bracket $E^{30}$ secured to the top of the plate $E^{15}$ in such position that the lever extends directly over the upper end of the vertical spindle E. The other end of said lever is pivoted to the upper end of a rod $E^{31}$ connected at its lower end to a chain $E^{32}$ passing around a drum $E^{33}$, which is fast on the spindle $E^5$ and carries a stop flange $E^{34}$ coöperating with another stop flange $E^{35}$ on the hub $E^4$ to confine the rotational movements of the spindle to an angle of 180°. The stop flanges $E^{34}$ and $E^{35}$ are normally held in one position of engagement by a spring $E^{36}$ surrounding the hub $E^4$ and acting on the drum $E^{33}$, so that the jaws $E^6$ are turned completely over by lifting the lever $E^{29}$ until the other position of engagement of the stop flanges is reached. When the lever $E^{29}$ is lowered the spring $E^{36}$ restores the jaws to their normal position.

The position in which the jaws $E^6$ deposit the sharpened blades is intermediate between the extremities of their swinging movement, and since said jaws are moved from the blade holder to the supply stack by the spring $E^{25}$ it suffices to employ a movable stop for arresting them in their blade-depositing position. The stop employed for this purpose consists of a pin $E^{37}$ arranged to slide vertically in lugs $E^{38}$ carried by the front end portion $E^1$ of the bracket $E^2$, said pin being surrounded by a spring $E^{39}$ which operates to force its upper end into the path of movement of a stud $E^{40}$ carried by the plate $E^{15}$ on its bottom face. The stop pin is withdrawn from the path of movement of the stud $E^{40}$ by lifting the rear end of a lever $E^{41}$ pivotally supported on the bracket $E^2$ and having its front end located in a vertical slot formed in the lower end of said pin, where it passes between two cross pins $E^{42}$. When the stud $E^{40}$ is located in front of and in contact with the upper end of the stop pin $E^{37}$ the jaws $E^6$ are in such position that a blade carried thereby is held over another stack-supporting block G, with the end perforations in the blade directly above the tapered upper ends of two pins $G^1$ carried by said block and extending vertically upward therefrom. The block G is supported by a rod $G^2$ mounted to slide vertically in a fixed guide $G^3$ carried by the arm $F^3$, and is raised and lowered by means similar to those employed for raising and lowering the block F and comprising a lever $G^4$ pivoted at its rear end to a fixed support $G^5$ and having its front end located in a vertical slot $G^6$ in the lower end of the rod $G^2$, where it passes between two cross pins $G^7$. An upright rod $G^8$ is pivoted at its lower end to the lever $G^4$ and guided at its upper end by passing through a perforation in a plate $G^9$ secured to the top of the plate $E^3$, so that by lifting said rod the block G may be elevated sufficiently to cause the pins $G'$ to enter the perforations in the blade held above them, the blade being retained by these pins when the jaws are opened and move away. The block G is forced downward when the rod $G^8$ is lowered by means of a spring $G^{10}$ surrounding said rod.

In order to facilitate the removal of the accumulated blades successively deposited on the block G, said block is removably supported on a plate $G^{11}$ secured to the top of the rod $G^2$ and provided with two upwardly-extending positioning pins $G^{12}$, Fig. 9, which enter perforations in the block G. Thus the block G with its pins $G^1$ and the stack of blades thereon can be lifted bodily from the plate $G^{11}$ and replaced after the blades have been removed. If preferred, the stack of blades can be lifted from the block G without removing the latter, the ends of the block being beveled as at $G^{13}$, Fig. 9, to facilitate the grasping of the ends of the stack by the attendant.

The mechanism for reversing the blades edge for edge is shown in Figs. 8, 9 and 10, and comprises a rotatable spindle H extending horizontally from front to back in the rear of and above the grinding wheel $B^4$, and provided with a pair of blade-gripping jaws and with means for operating these jaws and rotating the spindle which are similar to the corresponding parts employed for the like purposes in connection with the blade-carrying spindle $E^5$. Provision is made for moving the spindle H in the direction of its axis by journaling a portion of the length of the spindle in a sleeve $H^1$ which is itself adapted to slide forward and backward in the outer end of a bracket $H^2$ carried by a plate $H^3$ bolted to the right hand face of the plate $E^3$. The sleeve $H^1$ is prevented from rotating on the spindle H as an axis by means of a fixed guide rod $H^4$ carried by and extending rearwardly from the bracket $H^2$, parallel with the spindle, and passing through a lug $H^5$ projecting laterally from a hub $H^6$ which is clamped upon the sleeve near its rear end. The rear portion of the spindle H is supported by a bracket $H^7$ carried by the plate $H^3$, in which bracket the spindle is adapted to rotate and slide longitudinally. The jaws $H^8$ carried by the spindle H are pivoted to the front end of the latter and provided between their front ends with a spring $H^9$ for separating them, and are operated to grip a blade by means of a conical sleeve $H^{10}$ loosely mounted on the spindle H and adapted to wedge apart the rear ends of the jaws when said sleeve $H^{10}$ is forced forward. This sleeve is operated by means of a yoke $H^{11}$ entering an annular groove in the sleeve and secured to the front end of a horizontal rod $H^{12}$ mounted to slide longitudinally in supports $H^{13}$ and $H^{14}$ carried by a collar $H^{15}$ clamped upon the front end of the sleeve $H^1$ and by the hub $H^6$ respectively. A bell crank lever $H^{16}$ pivotally supported between the arms of a bracket $H^{17}$ extending upward from the support $H^{14}$, as shown in Fig. 10, has its downwardly-projecting arm forked at its lower end to receive the rear end of the rod $H^{12}$ and provided with notches in which are located the ends of a transversely-extending pin $H^{18}$ carried by said rod, so that by lifting the forwardly-extending arm of the lever $H^{16}$ the rod $H^{12}$ is forced forward to close the jaws $H^8$. The sleeve $H^{10}$ is moved backward by a spring $H^{19}$ surrounding and acting on the rod $H^{12}$.

The spindle H is rotated in one direction by lifting a lever $H^{20}$ pivoted at one end to the top of the support $H^{13}$ and connected at its other end to a chain $H^{21}$ passing around a drum $H^{22}$, which is secured to the spindle H in the rear of the sleeve $H^1$ and carries a stop flange $H^{23}$ coöperating with another stop flange $H^{24}$ on said sleeve $H^1$ to confine the rotational movements of the spindle to an angle of 180°. The stop flanges $H^{23}$ and $H^{24}$ are normally held in one position of engagement by a spring $H^{25}$ surrounding the sleeve $H^1$ and acting on a pin $H^{26}$ carried by the stop flange $H^{23}$ on the drum $H^{22}$. Inasmuch as the parts which rotate the spindle H and operate the jaws $H^8$ all move forward and backward with the spindle, they are equally operative in any longitudinal position of said spindle and jaws.

The jaws $H^8$ are normally located one above the other at the same elevation as the jaws $E^6$, and the location of the spindle H is such that when it reaches the limit of its forward movement said jaws are in position to embrace the rear end of a blade supported by the blade carrier $C^{13}$ and grip it midway between its edges, with the length of the blade in line with the axis of the spindle. Hence the blade can be reversed edge for edge by imparting a half rotation to the spindle H while the blade is held by the jaws $H^8$, the result of which operation is to turn the blade over without otherwise affecting its position. The spindle H is moved forward by lifting the forwardly-extending arm of a bell crank lever $H^{27}$ pivotally supported by an arm $H^{28}$ bolted to the top of the bracket $H^7$, the lower end of said lever being connected by a link $H^{29}$ to the hub $H^6$ at one side of the latter, as shown in Figs. 5 and 8. A collar $H^{30}$ clamped on the spindle in front of the hub $H^6$ serves as a stop for arresting the forward movement of the spindle by engaging the rear face of the bracket $H^2$, and a spring $H^{31}$ connecting the collar $H^{15}$ and the bracket $H^7$ draws the spindle backward whenever such movement is permitted.

It will be evident that the blade-rotating mechanism just described is structurally and functionally independent of the other mechanisms to such an extent that it may be left idle or omitted entirely without making it necessary to change any of the other parts, in case the machine is to be used for grinding blades having a single cutting edge.

The mechanism for opening and closing the blade holder $C^{13}$ comprises a link I pivotally connected at one end to the top of the clamping plate $C^{20}$ and extending thence through a guide $I^1$ to the lower end of an arm $I^2$, to which it is pivoted at a point adjacent to the cap bolt $C^9$. The arm $I^2$ is adjustably secured to the front end of a short rock shaft $I^3$ which is mounted in a bracket $I^4$ carried by the arm $C^{22}$ and extends from front to rear, substantially in line with another rock shaft $I^5$ mounted in a bracket $I^6$ integral with the arm $C^{25}$, as shown in Fig. 3. The rock shafts $I^3$ and $I^5$ are connected by universal joints to the opposite ends of a rod $I^7$ extending between them, and the rock shaft $I^5$ is provided at its rear end with a segmental gear $I^8$ meshing with a similar segmental gear $I^9$ which is pivotally supported on a stud $I^{10}$ carried by the arm $C^{25}$ and has an operating arm $I^{11}$. By elevating this arm $I^{11}$ until a lug $I^{12}$ on the gear $I^8$ strikes the top of a projection $I^{13}$ on the bracket $I^6$, the clamping plate $C^{20}$ is lifted to a substantially vertical position, thereby opening the blade holder. A spring $I^{14}$ acting on the rock shaft $I^5$ coöperates with the springs $C^{21}$ in closing said clamping plate $C^{20}$ and causing it to exert a firm pressure on the blade in the holder. Since the rock shaft $I^3$ moves upward and downward with the frame $C^3$ and has a universal joint connection with the rock shaft $I^5$, the raising and lowering of said frame has no effect on the opening and closing of the blade holder.

Figure 4:
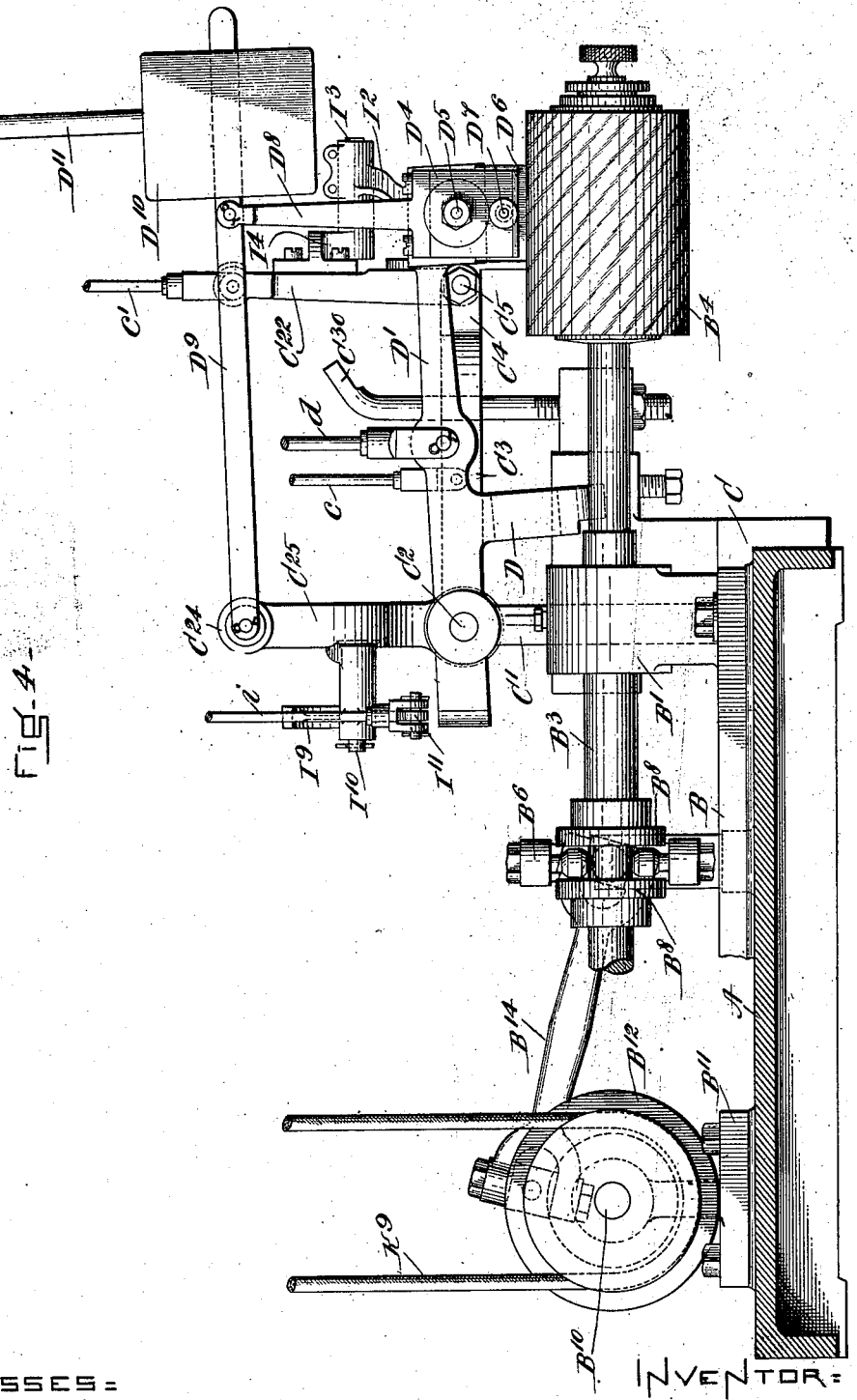
Fig. 4 is a side elevation showing the grinding wheel and the parts which hold the blade upon the same, as viewed from the left.

It will be seen that the various mechanisms above described are all arranged for operation by pull rods or similar connections extending upward therefrom to an actuating and timing mechanism located above them, and this is desirable for the reason that it saves space and renders the apparatus as a whole less complicated than it otherwise would be, but inasmuch as the blade-manipulating and grinding mechanisms may be actuated and timed by any suitable means without affecting the manner or result of their operation I will describe a complete cycle of operations of these mechanisms without regard to the means employed for actuating and timing them. The grinding wheel $B^4$ rotates and reciprocates continuously throughout the cycle, and as soon as the grinding of a blade has been completed the frame D which carries the pressure bar $D^6$ is lifted far enough to keep said bar out of the way of the parts which subsequently come beneath it and the frame $C^3$ is lifted at practically the same time until its front portion strikes against a fixed stop $C^{30}$, Figs. 3 and 4, which overhangs it, the blade holder $C^{13}$ and the blade therein being thereby elevated to a position in which the blade lies in the horizontal plane in which the jaws $E^6$ meet when closed. Fig. 9 shows a Gillette blade J in this position. The blade-holder is then opened and at the same time the open jaws $E^6$ are swung toward it until they stop in the position already described, with the projecting edge of the blade between them. They are then closed and caused to grip the blade, and thereupon the blade holder is lowered to a position intermediate between its uppermost position and the grinding wheel, thereby withdrawing the pins $C^{19}$ from the perforations in the blade. The jaws and blade are then swung by the spring $E^{25}$ toward the blade supply stack until the stud $E^{40}$ strikes the upper end of the stop pin $E^{37}$, which at this time is in its uppermost position, and are thereby arrested in the blade depositing position over the block G, whereupon said block is elevated until the pins $G^1$ enter the end perforations in the blade. The jaws are then opened, the stop pin $E^{37}$ is pulled downward and the spring $E^{25}$ immediately swings the jaws to the blade-receiving position, the blade being retained by the pins $G^1$. Before the jaws reach this position the stack of blades on the block F is elevated until the uppermost blade in the stack is brought into contact with the bottom face of the suction pad $F^{13}$, suction is established through the tube $F^{22}$, and the block F is immediately lowered, so that when the open jaws $E^6$ stop above the supply stack the projecting edge of a blade held by suction against the bottom face of the pad $F^{13}$ is located between them. The jaws are then closed on the blade and swung to the other end of their path of movement, where they hold the blade directly over the blade holder, the latter having in the meantime remained open and in its partially lowered position. As soon as the blade leaves the pad $F^{13}$ the suction is cut off. The blade holder is then elevated to its uppermost position, thereby causing the pins $C^{19}$ to enter the perforations in the blade located above it, the jaws $E^6$ are opened and move away and the blade holder is closed, thereby clamping the blade therein. The jaws stop in the blade-depositing position, the stop pin $E^{37}$ having been elevated as soon as the stud $E^{40}$ has passed it during the movement of the jaws toward the blade holder, but they have no blade between them at this time and merely remain idle during the succeeding grinding operation. After the jaws $E^6$ have moved away and the blade has been clamped in the blade holder as above described the frame $C^3$ is lowered until the projecting edge of the blade rests upon the top of the grinding-wheel $B^4$, and this movement is immediately followed by the lowering of the frame D until the pressure bar $D^6$ rests upon and is supported by the projecting edge of the blade, as shown in Fig. 1. The under side of this edge is then ground by the wheel $B^4$ during such interval as experience has shown to be required for the purpose, the other parts remaining idle during this interval, and at the end of the interval the frames D and C³ are again elevated as above described. The jaws E⁶ are then swung into position to grasp the projecting edge of the blade and are closed thereon, the blade holder is opened and partially lowered as before to free it from the blade, and thereupon the blade-carrying spindle E⁵ is given a half rotation. This reverses the blade side for side and presents the unground side of the same blade edge at the bottom of the blade. While the blade is held in this position the blade holder is again elevated to its uppermost position, the jaws are opened and swung into the blade-depositing position, leaving the reversed blade in the blade holder, and the latter is immediately closed, the spindle E⁵ being given a half rotation in the opposite direction during the movement of said jaws into their idle position. The blade-holder and pressure bar are then lowered as before and what is now the under side of the same blade edge is ground during an equal interval. At the end of this interval the pressure bar and blade holder are again elevated to their uppermost positions and the blade holder is opened, whereupon the spindle H is moved forward until the open jaws H⁸ embrace the adjacent end of the blade, on which they are immediately closed. The blade-holder is then partially lowered again to free it from the blade and the blade is then reversed edge for edge by imparting a half rotation to the spindle H. While the spindle H and jaws H⁸ remain in the position thus assumed the blade holder is again elevated to its uppermost position, and then the jaws H⁸ are opened and the spindle H and jaws H⁸ are moved backward to their idle position, leaving the blade in the blade holder with its unground edge projecting therefrom. During their backward movement said spindle and jaws are given a half rotation in the opposite direction. The blade holder is then closed upon the blade and it and the pressure bar are again lowered into the grinding position, whereupon the under side of the blade edge now presented to the wheel B⁴ is ground during another equal interval. At the end of this interval the blade is again reversed side for side in the manner already described by the spindle E⁵ and jaws E⁶, which then move once more into their idle position, and after the blade holder has been closed and it and the pressure bar have been lowered as before the other side of the same blade edge is ground during another equal interval, which completes the cycle.

The overhead mechanism employed for operating the blade grinding and manipulating parts as above described is shown in Figs. 18, 19 and 20 and comprises an open frame K bolted at one end to a vertical wall or other support in such position that the frame extends forward over the parts below it. To the top of the frame K is bolted a transversely-extending supplemental frame K¹ having upwardly-extending arms in the upper ends of which is journaled a horizontal driving shaft K² carrying fast and loose pulleys K³ and K⁴. A belt K⁵ connects the pulley K³ to the source of power and is shifted onto the pulley K⁴, whenever it is desired to stop the shaft K², by a belt shipper K⁶ operated by means of a vertical rod K⁷ which extends downward to a point within reach of the attendant, where it passes through a guiding bracket K⁸. The shaft K² carries a belt pulley K⁹ which is fast on the shaft and drives the countershaft B¹⁰ by means of the belt K¹⁰, Fig. 4, and also carries two other belt pulleys K¹¹ and K¹², both of which are loose on the shaft. The pulley K¹¹ is driven by a belt (not shown) from the source of power and has another belt pulley K¹³ rigidly secured to it, the latter being the pulley to which the pulley B⁵ on the shaft B³ is belted as previously described. Thus the rotation of the grinding wheel B⁴ is independent of the other operations and hence said wheel can be kept in rotation while the other parts are at rest and without reciprocating it, which is advantageous when the machine is used for honing and it becomes necessary to dress the wheel B⁴. When it is desired to stop the rotation of the wheel B⁴ the belt which drives the pulley K¹¹ is shifted on to the idle pulley K¹² by a belt shipper K¹⁴ operated by means of a vertical rod K¹⁵ which, like the rod K⁷, extends downward to a point within reach of the attendant and is guided near its lower end by passing through a bracket K¹⁶.

In the upright front end K¹⁷ of the frame K and in another upright K¹⁸ carried by said frame is journaled a horizontal shaft K¹⁹ extending from front to back and carrying a drum K²⁰. Below this drum is located a horizontal rod K²¹ supported at its ends by the uprights K¹⁷ and K¹⁸ and extending parallel with the shaft K¹⁹, on which rod a number of transversely-extending levers K²² are pivotally supported. In the specific construction illustrated there are thirteen of these levers, all of which are substantially alike in construction, arrangement and mode of operation. One arm of each lever curves upward toward the drum K²⁰ and is provided with a roller K²³ located in line with one or more cams carried thereby. The other arm of each lever, with one exception, is connected at its outer end by a pull rod to one of the mechanisms below and operates the same by moving upward, these arms being of such length that their outer ends are located substantially above the respective mechanisms which they operate.

Following the order of the levers K²² from left to right as shown in Fig. 19, and omitting the lever specifically excepted above (which is the third from the left hand end of the series,) the pull rod connections are as follows: The rod $e^1$ is connected to the upper end of the rod $E^{14}$ which closes the jaws $E^6$. The rod $e$ is connected to a link $E^{43}$ pivoted to the lever $E^{29}$ which rotates the blade-carrying spindle $E^5$, the link $E^{43}$ being located directly above the spindle E. The lever $e^2$ is connected to the rear end of the lever $E^{41}$ which moves the stop pin $E^{37}$ downward. The rod $d$ is connected to one side of the frame D and thus serves to raise and lower the pressure bar $D^6$. The rod $c$ is connected to one side of the frame $C^3$ and thus serves to raise and lower the blade holder. The rod $e^3$ is connected to the arm $E^{24}$ which rotates the spindle E. The rod $g$ is connected to the upper end of the rod $G^8$ which lifts the block G. The rod $f$ is connected to the upper end of the rod $F^5$ which lifts the block F. The rod $h$ is connected to the lever $H^{20}$ which rotates the spindle H. The rod $h^1$ is connected to the forwardly-extending arm of the lever $H^{16}$ which closes the jaws $H^8$. The rod $h^2$ is connected to the forwardly-extending arm of the lever $H^{27}$ which moves the spindle H forward. The rod $i$ is connected to the arm $I^{11}$ which opens the blade holder $C^{13}$. Each of the pull rods above mentioned passes at its upper end through the perforated outer end of the corresponding lever $K^{22}$, in which it can rotate if necessary, and is supported by a nut $K^{24}$ whereby it can be adjusted vertically. Springs $K^{25}$, interposed between the levers $K^{22}$ and nuts $K^{24}$, serve to take up any excessive upward movement of those levers which operate mechanisms having fixed stops for limiting their corresponding movements.

The third lever from the left hand end of the series shown in Fig. 19 operates a push rod $f^1$ extending upward therefrom and having its lower end passed through the perforated outer end of the lever, on which it is supported by a block $K^{26}$ adjustably secured to the rod. At its upper end the push rod $f^1$ is connected to a valve consisting, as shown in dotted lines in Fig. 19, of a rod $K^{27}$ adapted to move vertically in a casing $K^{28}$, in which it has a close sliding fit, and provided with a circumferential groove $K^{29}$ so located that when the rod $K^{27}$ is lifted by the rod $f^1$ said groove is brought in line with diametrically-opposite passages leading respectively to pipes $K^{30}$ and $K^{31}$ carried by the casing $K^{28}$, thereby establishing communication between them. The pipe $K^{30}$ is connected to the upper end of the flexible tube $F^{22}$ leading to the suction device previously described and the pipe $K^{31}$ is connected to a vacuum chamber, (not shown,) so that suction will be exerted at the bottom face of the pad $F^{13}$ whenever the valve above described is open. The rod $K^{27}$ is provided at its upper end with a weight $K^{32}$ which moves it downward and closes the valve whenever the push rod $f^1$ moves downward, thereby cutting off communication between the pipes $K^{30}$ and $K^{30}$. The casing $K^{28}$ is carried by a laterally-extending arm $K^{33}$ bolted to the top of the frame K.

To the bottom of the frame K is secured a fixed bracket $K^{34}$ by which a horizontal lever $K^{35}$ is pivotally supported, with the rear end of the lever passing through a vertical slot in another fixed bracket $K^{36}$. The front end of the lever $K^{35}$ is connected to the upper end of the arm $C^{22}$ on the frame $C^3$ by an upright rod $c^1$, the upper end of which passes through a socket $K^{37}$ pivoted to said lever and slides vertically therein when the frame $C^3$ moves upward and downward. A supporting nut $K^{38}$ carried by the rod $c^1$ is so adjusted thereon that when the projecting edge of a blade in the blade holder $C^{13}$ rests upon the top of the grinding wheel $B^4$ said nut $K^{38}$ is in engagement with the top of the socket $K^{37}$ and holds the rear end of the lever $K^{35}$ slightly elevated above the bottom of the bracket $K^{36}$, which serves as a support therefor when lowered, and on the rearwardly-extending arm of said lever $K^{35}$ is mounted a counterweight $K^{39}$ which substantially balances the weight of the frame $C^3$ and the parts carried thereby, including the rod $C^1$. Said counterweight thus constitutes a pick-up weight which becomes effective just before the blade reaches the grinding position when the frame $C^3$ is lowered, and hence the pressure exerted by the blade upon the wheel $B^4$ is determined by the weight of the frame D and the parts carried thereby, supplemented by the adjustable weight $D^{10}$.

The cams carried by the drum $K^{20}$ are designated generically by the letter $K^{40}$, as it will be unnecessary to describe each cam specifically, it being understood that each of the levers $K^{22}$ is operated during each rotation of the drum by one or more of these cams, and that the cams have such shapes and are so located with reference to one another that the levers on which they act are caused to operate the parts connected thereto in such sequence and during such intervals as to produce the above-described cycle of operations of said parts. All the cams $K^{40}$ which operate between two consecutive grinding operations are conveniently formed integral with a single plate, the drum $K^{20}$ being thus made up of four such plates, as shown in Figs. 18 and 19, and while the rollers $K^{23}$ are located between the ends of successive cams they are held out of contact with the drum by the engagement of stop arms $K^{41}$ on the respective levers $K^{22}$ with the edge of a flange $K^{42}$ extending laterally from the bottom of the frame K. This saves expense in the construction of the drum and cams, The drum $K^{20}$ is rotated in the direction of the arrow shown in Fig. 18 by means of a worm gear $K^{43}$ secured to the rear end of the shaft $K^{19}$ and meshing with a worm $K^{44}$ mounted on a countershaft $K^{45}$ which extends horizontally at right angles to the shaft $K^{19}$. This countershaft is journaled in suitable bearings on a frame $K^{46}$ pivotally supported at its left hand end by a bracket $K^{47}$ bolted to the upright $K^{18}$, and is continuously rotated by a belt $K^{48}$ connecting two pulleys $K^{49}$ and $K^{50}$, which are fast on the shaft $K^2$ and countershaft $K^{45}$, respectively. When the frame $K^{46}$ is in its uppermost position the worm $K^{44}$ and the gear $K^{43}$ are in mesh with each other and the drum $K^{20}$ is rotated, but during each grinding operation the rotation of the drum is stopped by lowering said frame and thereby disengaging the worm $K^{44}$ from the gear $K^{43}$. The necessity of employing a cam drum of excessive size, such as would be required if it had to rotate continuously during the grinding operations, is thus avoided.

The raising and lowering of the frame $K^{46}$ is accomplished as follows: A transversely-extending shaft $K^{51}$ journaled in a fixed bracket $K^{52}$ is continuously rotated by a belt $K^{53}$ connecting two pulleys $K^{54}$ and $K^{55}$ secured to said shaft and to the shaft $K^2$ respectively, and carries a worm $K^{56}$ meshing with a worm gear $K^{57}$ loosely mounted on another shaft $K^{58}$, which is journaled in fixed brackets $K^{59}$ and $K^{60}$ and extends at right angles to the shafts $K^{45}$ and $K^{51}$, below the right hand end of the frame $K^{46}$. To the worm gear $K^{57}$ is secured one member of each of two friction clutches $K^{61}$ and $K^{62}$, the other members of which turn with the shaft $K^{58}$ and are pressed toward each other by a spring $K^{63}$, so that the shaft $K^{58}$ is frictionally driven by the shaft $K^{51}$. The shaft $K^{58}$ also carries a cam $K^{64}$ on which rests a roller $K^{65}$ on the frame $K^{46}$, whereby said frame is raised to its uppermost position, and as soon as this position has been reached the rotation of the shaft $K^{58}$ is stopped by a pivoted latch arm $K^{66}$ acted on by a spring $K^{67}$ which moves its lower end in front of a stop shoulder $K^{68}$ formed on a disk $K^{69}$ secured to said shaft. Thereupon the shaft $K^{58}$ and the parts carried thereby remain at rest with the frame $K^{46}$ held in its uppermost position by the cam $K^{64}$ until the resulting rotation of the worm gear $K^{43}$ and drum $K^{20}$ causes one or another of four pins $K^{70}$ carried by and projecting laterally from said worm gear $K^{43}$ to engage the upper end of the latch arm $K^{66}$ and thereby move its lower end out of engagement with the stop shoulder $K^{68}$, whereupon the shaft $K^{58}$ and cam $K^{64}$ are immediately rotated, the frame $K^{46}$ is lowered by gravity, and the drum $K^{20}$ remains at rest until said frame is again lifted by the cam $K^{64}$. The pins $K^{70}$ are circumferentially adjustable on the worm gear $K^{43}$ and are so located with respect to the cams $K^{40}$ that the latch arm $K^{66}$ is operated to release the shaft $K^{58}$ at about the time when each grinding operation commences. The upper end of said latch arm is so arranged that the pins $K^{70}$ pass over it after the shaft $K^{58}$ has been released, and leave it subject to the action of the spring $K^{67}$.

From the foregoing description it will be evident that the length of the interval allowed for each grinding operation will depend upon the speed at which the main driving shaft $K^2$ is rotated, this speed being determined according to the interval desired. Since this speed when once determined remains constant the length of each interval during which grinding is going on will also be constant, but the same effect as would result from varying the interval may be readily obtained by varying the pressure exerted on the grinding wheel $B^4$ by the blade being ground. This can be done either by the use of weights on the pin $D^{11}$ or by adjusting the weight $D^{10}$ lengthwise of the link $D^9$ which carries it.

Although the specific embodiment of my invention which has been described is particularly adapted and intended for use in combination with the blade holding and grinding mechanism shown in my prior patent above referred to, it will be understood that any or all of the blade-manipulating mechanisms can be used or adapted for use with grinding apparatus otherwise constructed, and can be modified in various ways as regards their construction and arrangement, without departing from my invention. The general features of the overhead mechanism can also be used to advantage in connection with a variety of machines which are adapted to have their parts operated in a predetermined cycle by pull rods, push rods and the like.

I claim:—

1. In a blade-sharpening machine, the combination with a blade stack support of means for successively taking the blades from the top of the stack and holding each blade in a predetermined position.

2. In a blade-sharpening machine, the combination of a blade stack support, means for raising and lowering it, and a blade-removing device located above the support in position to operate on the uppermost blade in the stack.

3. In a blade-sharpening machine, the combination of a blade stack support, means for raising and lowering it, a suction device located above the support, and means for exerting suction on the uppermost blade in the stack when in contact with the suction device, whereby said blade is separated from the stack and held in a predetermined position when the stack support is lowered.

4. In a blade-sharpening machine, the combination of a blade stack support carrying upwardly-extending positioning pins, means for raising and lowering it, and a blade-removing device located above said support and pins and having perforations to receive the latter when the support is raised.

5. In a blade-sharpening machine, the combination of a blade stack support carrying upwardly-extending positioning pins, means for raising and lowering it, and a laterally-movable blade-removing device normally located above said support and pins, adjacent to the upper ends of the latter, and having perforations to receive the pins when the support is raised.

6. In a blade-sharpening machine, the combination of a blade stack support carrying upwardly-extending positioning pins, means for raising and lowering it, a suction device located above the support and pins and having perforations to receive the latter when the support is raised, and means for exerting suction on the uppermost blade in the stack when in contact with the suction device.

7. In a blade-sharpening machine, the combination of a blade carrier comprising blade-gripping jaws and means for opening and closing them, means for moving the jaws in a predetermined path, and means for removably holding a blade in position to be received between the jaws at one point in said path.

8. In a blade-sharpening machine, the combination of a blade holder, a blade carrier, means for moving the blade carrier toward and away from the blade holder, and means for transferring a blade from the carrier to the holder.

9. In a blade-sharpening machine, a blade carrier comprising a spindle, blade-gripping jaws carried thereby and extending transversely beyond it, means for opening and closing the jaws, and means for rotating the spindle and thereby swinging the jaws in a predetermined path.

10. In a blade-sharpening machine, a blade-carrying mechanism comprising a support, a spindle journaled therein, means for positively rotating the spindle in one direction, a spring for effecting its return movement, stops for limiting the rotational movements of the spindle, and means carried by said spindle for engaging and releasing a blade.

11. In a blade-sharpening machine, a blade carrying and reversing mechanism comprising two spindles, one of which is carried by and extends transversely with respect to the other, blade-gripping jaws on the latter spindle, means for opening and closing said jaws, and means for independently rotating both spindles.

12. In a blade-sharpening machine, the combination with a blade holder of a blade-reversing mechanism comprising a rotatable spindle provided with means for engaging a blade, means for imparting a half rotation to said spindle, and means for effecting the transfer of the blade from the holder to the reversing mechanism, and back again.

13. In a blade-sharpening machine, the combination of a movable support, a spindle journaled therein, blade-gripping jaws pivoted to the spindle between their front and rear ends and projecting longitudinally beyond one end of the spindle, a conical sleeve loosely mounted on the spindle behind the jaws and arranged to wedge their rear ends apart when forced forward, a spring for opening the jaws, means movable with said support for positively imparting a half-rotation to the spindle in one direction, a spring for effecting the return half-rotation of the spindle, and means for operating the conical sleeve in any position of the spindle.

14. In a blade-sharpening machine, the combination of a support, a vertical spindle journaled therein and means for rotating the same, a horizontal spindle carried by the vertical spindle and provided with blade-gripping jaws, means for opening and closing said jaws, and means for imparting a half-rotation to the horizontal spindle.

15. In a blade-sharpening machine, a blade-reversing mechanism comprising a fixed support, a sleeve mounted to slide therein, means for moving the sleeve toward and away from the blade, a spindle journaled in said sleeve and movable with the latter in the direction of its axis, blade-gripping jaws carried by and projecting beyond one end of said spindle, means for opening and closing the jaws, and means for imparting a half rotation to the spindle.

16. In a blade-sharpening machine, the combination of a blade holder, a blade carrier, means for positively moving said carrier into position to take a blade from the holder, a spring for moving the carrier in the opposite direction, a movable stop for arresting the latter movement of the carrier, and means for taking a blade from the carrier while its movement is thus arrested.

17. In a blade-sharpening machine, the combination of a blade carrier movable in a predetermined path, means for delivering a blade to the carrier at one end of its path, a blade holder located at the other end of said path, means for positively moving the carrier from the blade-delivering means to the blade holder, a spring for effecting its return movement, a movable stop for arresting the return movement of the carrier at an intermediate point in its path, and means for taking a blade from the carrier when in its last-mentioned position.

18. In a blade-sharpening machine, a blade-receiving device comprising a support and means for raising and lowering it, a block removably mounted on the upper end of the support, means for positioning the block thereon, and upwardly-extending pins carried by said block.

19. In a blade-sharpening machine, the combination of a movable frame arranged to move upward and downward, a blade holder carried thereby and having a spring-actuated clamping plate for securing a blade in the holder, and means for opening the holder comprising a rock shaft carried by the frame, a link connecting the same to the clamping plate, and an operating device having universal joint connections with the rock shaft for imparting a partial rotation to the latter.

20. In a blade-sharpening machine, the combination of a grinding wheel, a blade-holder adapted to present the edge of a blade upon the top of the wheel, a pressure bar arranged to rest upon the blade and hold it upon the wheel, means for raising and lowering the pressure bar and blade holder, a weighted lever, means for normally supporting the same in a substantially horizontal position, and means connecting said lever and blade holder and arranged to lift the weight just before the blade comes in contact with the grinding wheel when the blade holder is lowered.

21. In a blade-sharpening machine, the combination of a grinding wheel, a frame movable upward and downward with respect to said wheel, a blade holder carried by the frame, a weighted pressure bar arranged to rest upon the blade and hold it upon the grinding wheel, means for raising and lowering the pressure bar and frame, and a pick-up weight adapted to counterbalance the frame and the parts carried thereby and arranged to become effective just before the blade reaches the top of the grinding wheel when the frame is lowered.

22. In a blade-sharpening machine, the combination with blade grinding and manipulating mechanisms of an operating and timing mechanism comprising a series of levers connected respectively to the blade-manipulating mechanisms, a rotary drum having cams for operating said levers, means for rotating the drum, and means for automatically stopping said drum during the grinding operations.

23. In a blade-sharpening machine, the combination with blade-grinding and manipulating mechanisms of an operating and timing mechanism comprising a series of levers connected respectively to the blade-manipulating mechanisms, a rotary drum having cams for operating said levers, and means for rotating the drum comprising a gear connected thereto, a driving mechanism for said gear, means for moving the driving mechanism into and out of engagement with the gear, and means operated by the rotation of said gear for controlling the movements of the driving mechanism therefor.

24. In a blade-sharpening machine, the combination of a grinding wheel, a power-driven shaft and means for starting and stopping the same, connections between said shaft and the grinding wheel for reciprocating the latter on its longitudinal axis, and independent means for rotating the grinding wheel while said shaft is at rest.

25. An actuating and timing mechanism comprising a series of levers, a rotatable drum provided with cams for operating the respective levers, means for rotating the drum, and means operated by the rotation of the drum for temporarily stopping it.

26. An actuating and timing mechanism comprising a series of levers, a rotatable drum provided with cams for operating the respective levers, a gear connected to the drum for rotating the same, a movable frame having a continuously-driven shaft journaled therein and provided with means for engaging and driving said gear, a frictionally driven shaft provided with means whereby said frame is moved into and out of gear-driving position, a latch arranged to stop the rotation of the latter shaft when the frame is in the gear-driving position, and means operated by the rotation of the gear for tripping said latch.

27. An operating and timing mechanism comprising a series of levers, a rotatable drum provided with cams for operating the respective levers, a gear connected to the drum for rotating the same, a frame arranged to move upward and downward and having a continuously-driven shaft journaled therein, means on said shaft for engaging and driving said gear when the frame is elevated, a frictionally-driven shaft having a cam thereon for raising and lowering said frame and also carrying a disk provided with a stop shoulder, a spring-actuated latch adapted to engage said shoulder and thereby hold the frame in its elevated position, and a pin carried by said gear and arranged to trip said latch.

28. In a blade-sharpening machine, the combination of a blade holder having blade-positioning devices thereon, a blade carrier and means for moving the same into position to hold a blade over the blade holder, means for raising the holder while the blade is so held, means for releasing the blade from the carrier, and means for clamping the blade in the holder.

29. In a blade-sharpening machine, the combination of a blade holder provided with upwardly-extending positioning pins and with means for clamping a blade therein, means for holding a perforated blade above the holder with the perforations in the blade directly over the positioning pins, and means for raising the holder to the plane of the blade and lowering the same after the blade has been clamped therein.

30. In a blade-sharpening machine, the combination of a blade holder provided with upwardly-extending positioning pins and having means for clamping a perforated blade therein with said pins located in the perforations in the blade, means for raising and lowering the blade holder, a blade-reversing mechanism movable toward and away from the blade holder when in its uppermost position and provided with means for engaging a blade in the holder, means for opening and closing the blade holder, and means for operating the blade reversing mechanism to reverse the blade after the holder has been opened and lowered.

31. In a blade-sharpening machine, the combination of a grinder, a blade holder, means for moving the blade holder into and out of grinding position, and means for taking a blade from the blade holder when out of grinding position, reversing the blade and replacing it in the holder.

32. In a blade-sharpening machine, the combination of a grinder, a blade holder, means for moving the blade holder into and out of grinding position, means for taking a blade from the blade holder when out of grinding position, reversing the blade side for side and replacing it in the holder, and means for taking a blade from the holder when out of grinding position, reversing the blade edge for edge and replacing it in the holder.

33. In a blade-sharpening machine, the combination of a grinder, a blade holder, means for raising the blade holder to a predetermined position after each grinding operation and subsequently lowering it to an intermediate position, a blade-reversing device having means for engaging the blade in the holder when the latter is in its uppermost position, and means for effecting the reversal of the blade after the blade holder has been partially lowered.

34. In a blade-sharpening machine, the combination of a grinder, a blade holder located above the same, means for raising and lowering the blade holder, blade-reversing mechanisms arranged for operation at the level of the blade holder when in its uppermost position and each provided with a pair of blade-gripping jaws and means for opening and closing the same, means for moving one pair of jaws toward and away from one edge of a blade in the holder, means for moving the other pair of jaws toward and away from one end of the blade, and means for imparting a half rotation to each pair of jaws while the blade is held therein.

35. In a blade-sharpening machine, the combination of a grinder, a blade holder located above the same, means for raising and lowering the blade holder, a pressure bar movable upward and downward above the blade holder, means for raising and lowering the pressure bar, and means for depositing a blade in the blade holder or taking a blade therefrom when the holder is in a position intermediate between the pressure bar and the grinder.

36. In a blade-sharpening machine, the combination with blade grinding and manipulating mechanisms of a power-driven operating and timing mechanism located above the blade grinding and manipulating mechanisms, and operating connections between the latter and the power-driven mechanism.

37. In a blade-sharpening machine, the combination of a grinder, blade-manipulating mechanisms comprising a blade holder movable toward and away from the grinder and blade carrying and reversing mechanisms for placing a blade in the holder, reversing it with respect to the same and removing it therefrom, and a power-driven operating and timing mechanism connected to the blade-manipulating mechanisms and located above the same.

38. In a blade-sharpening machine, the combination of a grinder, blade-manipulating mechanisms comprising two frames arranged to move upwardly and downwardly above the grinder, a blade holder carried by one of the frames, a pressure bar carried by the other frame and a blade carrier movable toward and away from the blade holder when the latter is in an elevated position, and a power-driven operating and timing mechanism connected to the blade-manipulating mechanisms and located above the same.

39. In an operating and timing mechanism, a rotatable drum comprising a plurality of sections extending lengthwise of the drum and collectively constituting its periphery, each section having a plurality of cams formed integral therewith.

40. In a blade-sharpening machine, the combination with a blade holder of a blade-reversing mechanism comprising a spindle provided with means for engaging a blade while resting on the holder with the center of the blade in line with the axis of the spindle, means for separating the blade holder and blade while the latter is engaged by the reversing mechanism, and means for imparting a half rotation to the spindle.

41. In a blade-sharpening machine, the combination with a blade holder having blade-positioning devices thereon, of a spindle provided with blade-gripping jaws, means for opening and closing said jaws, means for moving the jaws into position to receive a blade while resting on the holder with the axis of the spindle passing through the center of the blade, means for removing the blade from the blade holder and replacing it thereon while held by the jaws, and means for imparting a half rotation to the spindle while the blade is removed from the blade holder.

42. In a blade-sharpening machine, the combination of a blade carrier comprising blade-gripping jaws and means for opening and closing them, means for moving said jaws in a predetermined path, means for removably holding a blade in position to be received between the jaws at one point in said path, a blade holder adapted to receive the blade from the jaws at another point in said path, and means for effecting the transfer of the blade from the jaws to the holder.

43. In a blade-sharpening machine, the combination of a blade holder, a support having a spindle journaled therein and provided with blade-gripping jaws, means for opening and closing said jaws, means for moving the jaws toward and away from the blade holder, means for imparting a half rotation to the spindle, and means for effecting the transfer of the blade from the blade holder to the jaws and back again.

44. In a blade-sharpening machine, the combination of a blade holder provided with upwardly-extending positioning pins, a blade carrier comprising a spindle provided with blade-gripping jaws, means for opening and closing said jaws, means for moving the jaws into position to grasp a blade while resting on said holder with the center of the blade in line with the axis of the spindle, means for raising and lowering the blade holder, and means for imparting a half rotation to the spindle.

In testimony whereof, I have hereunto subscribed my name this third day of September, 1915.

WILLIAM E. NICKERSON.

Witnesses:
E. D. CHADWICK,
JOSEPH T. BRENNAN.